US012776897B2

(12) United States Patent
Wang et al.

(10) Patent No.: US 12,776,897 B2
(45) Date of Patent: Oct. 27, 2026

(54) COMMUNICATION METHOD AND RELATED APPARATUS

(71) Applicant: HUAWEI TECHNOLOGIES CO., LTD., Shenzhen (CN)

(72) Inventors: Yong Wang, Shenzhen (CN); Jing Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 523 days.

(21) Appl. No.: 18/176,289

(22) Filed: Feb. 28, 2023

(65) Prior Publication Data

US 2023/0208625 A1 Jun. 29, 2023

Related U.S. Application Data

(63) Continuation of application No. PCT/CN2020/112249, filed on Aug. 28, 2020.

(51) Int. Cl.
*H04L 9/08* (2006.01)

(52) U.S. Cl.
CPC ............ *H04L 9/0833* (2013.01); *H04L 9/085* (2013.01); *H04L 9/0861* (2013.01); *H04L 9/0891* (2013.01)

(58) Field of Classification Search
CPC ..... H04L 9/0833; H04L 9/085; H04L 9/0861; H04L 9/0891; H04L 2209/84; H04L 9/3242; G06F 21/50
See application file for complete search history.

(56) References Cited

U.S. PATENT DOCUMENTS 6,249,867 B1 * 6/2001 Patel ..................... H04L 9/3271 380/278
8,248,294 B2 * 8/2012 Sampigethaya ......... G08G 5/26 342/36
(Continued)

FOREIGN PATENT DOCUMENTS

CN 101242323 A 8/2008
CN 101884193 A 11/2010
(Continued)

OTHER PUBLICATIONS

"Wireless Transport Layer Security," Wireless Application Protocol, WAP-261-WTLS-20010406-a, Version 06—Apr. 2001, total 106 pages (Apr. 2001).

*Primary Examiner* — John B King
(74) *Attorney, Agent, or Firm* — Leydig, Voit & Mayer, Ltd.

(57) ABSTRACT

Embodiments of the present disclosure provide a communication method and apparatus, applied to nodes supporting short-range communication, for example, Bluetooth nodes or nodes in an in-vehicle short-range communication system. The method includes receiving an association request message from a second node and determining a group key of a first communication group. The first communication group is a communication group to which the second node belongs. The method further includes encrypting the group key of the first communication group, based on a shared key between a first node and the second node, to obtain a first protection key and sending a first association establishment message to the second node. The first association establishment message includes a first protection key.

19 Claims, 19 Drawing Sheets

(56) References Cited

U.S. PATENT DOCUMENTS

| | | | | |
|---|---|---|---|---|
| 8,855,306 | B2 * | 10/2014 | Oba | H04L 9/0836 713/168 |
| 10,581,611 | B1 * | 3/2020 | Osborn | G06K 19/07309 |
| 11,336,506 | B1 * | 5/2022 | Li | H04N 21/2402 |
| 11,997,213 | B2 * | 5/2024 | Wang | G06Q 30/06 |
| 12,273,715 | B2 * | 4/2025 | Li | H04W 12/069 |
| 2002/0085721 | A1 * | 7/2002 | Saneto | H04L 9/3226 380/277 |
| 2002/0154782 | A1 * | 10/2002 | Chow | H04L 9/0836 380/278 |
| 2002/0184513 | A1 * | 12/2002 | Hori | G06Q 20/341 713/193 |
| 2003/0140227 | A1 * | 7/2003 | Asano | H04L 9/0822 713/157 |
| 2004/0086124 | A1 * | 5/2004 | Sasaki | H04L 9/0866 380/277 |
| 2006/0155981 | A1 * | 7/2006 | Mizutani | H04L 63/10 713/150 |
| 2008/0016350 | A1 | 1/2008 | Braskich et al. | |
| 2008/0075286 | A1 * | 3/2008 | Kim | H04L 9/0891 380/277 |
| 2009/0150668 | A1 * | 6/2009 | Liu | H04L 9/0833 380/281 |
| 2011/0055566 | A1 * | 3/2011 | Norrman | H04W 12/0431 713/168 |
| 2013/0080782 | A1 * | 3/2013 | Rajadurai | H04W 12/06 713/171 |
| 2014/0233736 | A1 | 8/2014 | Zhang et al. | |
| 2014/0237559 | A1 * | 8/2014 | Zhang | H04W 88/08 726/4 |
| 2015/0092942 | A1 * | 4/2015 | Wager | H04W 12/04 380/270 |
| 2017/0180120 | A1 | 6/2017 | Hanatani et al. | |
| 2017/0325270 | A1 * | 11/2017 | Tenny | H04W 76/14 |
| 2019/0246282 | A1 * | 8/2019 | Li | H04W 12/033 |
| 2020/0029210 | A1 * | 1/2020 | Rasales | H04L 63/04 |
| 2020/0067703 | A1 | 2/2020 | Zimmermann et al. | |
| 2020/0106617 | A1 * | 4/2020 | Rule | H04L 9/3234 |
| 2020/0119909 | A1 * | 4/2020 | Zhang | H04L 9/3247 |
| 2020/0137643 | A1 * | 4/2020 | Li | H04W 12/106 |
| 2020/0235914 | A1 * | 7/2020 | Zhang | H04L 9/0869 |

FOREIGN PATENT DOCUMENTS

| | | | | | |
|---|---|---|---|---|---|
| CN | 101884194 | A | | 11/2010 | |
| CN | 102761830 | A | | 10/2012 | |
| CN | 105103578 | A | | 11/2015 | |
| CN | 105592434 | A | * | 5/2016 | H04W 8/186 |
| CN | 106027233 | A | | 10/2016 | |
| CN | 109005539 | A | | 12/2018 | |
| CN | 109121469 | A | * | 1/2019 | H04W 76/14 |
| CN | 109922080 | A | | 6/2019 | |
| CN | 110933672 | A | | 3/2020 | |
| CN | 111567075 | A | | 8/2020 | |
| CN | 109005539 | B | * | 12/2021 | H04W 12/06 |
| EP | 3684024 | A1 | | 7/2020 | |
| JP | 2000181803 | A | | 6/2000 | |
| JP | 2007110570 | A | | 4/2007 | |
| JP | 2008530919 | A | | 8/2008 | |
| JP | 2015133589 | A | | 7/2015 | |
| JP | 2016527736 | A | | 9/2016 | |
| KR | 20060013029 | A | | 2/2006 | |
| KR | 20100130167 | A | | 12/2010 | |
| KR | 101327051 | B1 | * | 11/2013 | |
| KR | 20190056661 | A | | 5/2019 | |

* cited by examiner

| Communication group information | | | |
|---|---|---|---|
| GID | Included nodes | Group key | Group algorithm |
| GID1 | Node E0, node E1, node E2 | GK1 | - |
| GID2 | Node E3, node E4 | GK2 | Integrity protection algorithm: ZUC |
| GID3 | Node E5, node E6, node E7 | GK3 | Integrity protection algorithm: AES-CCM |
| ... | ... | ... | ... |

602

601

| Information about a security capability of a node | |
|---|---|
| Node | Information about a security capability |
| Node E0 | Integrity protection algorithms: AES-CCM, ZUC, and AES-GCM |
| Node E1 | Integrity protection algorithms: AES-CCM and AES-GCM |
| Node E2 | Integrity protection algorithms: AES-CCM and AES-GCM |
| ... | ... |

603

TO FIG. 6B

FIG. 6A

CONT. FROM FIG. 6A

| First algorithm selection policy | | | |
|---|---|---|---|
| Serial number | Label | Algorithm | Priority |
| 1 | 0001 | AES-CCM | 1 |
| 2 | 0010 | ZUC | 2 |
| 3 | 1000 | AES-GCM | 3 |
| ... | ... | ... | ... |

604

605

FIG. 6B

COMMUNICATION METHOD AND RELATED APPARATUS

CROSS-REFERENCE TO RELATED APPLICATIONS

This application is a continuation of International Application No. PCT/CN2020/112249, filed on Aug. 28, 2020, the disclosure of which is hereby incorporated by reference in its entirety.

TECHNICAL FIELD

The present disclosure relates to the field of communication technologies, and in particular, to the field of short-range communication technologies, for example, cockpit domain communication. Specifically, the disclosure relates to a communication method and a related apparatus.

BACKGROUND

With the rapid development of informatization, communication technologies have penetrated into people's lives. In a communication process of nodes, there are three communication modes: unicast, broadcast, and multicast.

Unicast is a point-to-point communication mode in which nodes of interest communicate with each other. Broadcast is a point-to-multipoint communication mode in which a node sends messages to all nodes in a subnet. Between the two modes is multicast, point-to-multipoint communication, in which a node (for example, referred to as a first node) sends a message to a node in a communication group, and all nodes in the communication group can receive the message. Multicast is one of the key technologies in computer networks, with a wide range of applications at an application layer, a network layer, and a media access layer, such as media broadcast, multi-party conference, and array detection.

In a communication process, to prevent data leakage and ensure communication security, security protection needs to be performed on a message in the communication process. Encryption of a unicast message may be implemented by using a unicast key, and a pair of private temporary keys (PTKs) may be established between two nodes to ensure one-to-one unicast security. Both unicast and multicast messages need to be protected. Only group members in a communication group know a group key used for encryption and decryption. In this way, only the group members can interpret encrypted packets, and non-group members cannot obtain packet content. This ensures multicast communication security.

The protection of multicast messages depends on the group key. Therefore, the protection of the group key is crucial. For a communication system, group key leakage enables an attacker to listen to a message in a group by using the group key, resulting in data leakage and threatening user privacy and security. Especially for an in-vehicle communication system, group key leakage possibly leads to leakage of important data of a vehicle, or communication between the vehicle and a node that steals the group key, threatening vehicle safety.

It can be learned that, how to protect privacy of a group key and improve security in a multicast communication process is a technical problem being studied by persons skilled in the art.

SUMMARY

Embodiments of this application disclose a communication method and a related apparatus, to protect privacy of a group key and improve security in a multicast communication process.

According to a first aspect, the present disclosure provides a communication method, including:

receiving an association request message from a second node;

determining a group key of a first communication group, where the first communication group is a communication group to which the second node belongs, and the group key of the first communication group is obtained based on at least one of a first freshness parameter and an identifier ID of the first communication group;

encrypting the group key of the first communication group based on a shared key between a first node and the second node, to obtain a first protection key; and sending a first association establishment message to the second node, where the first association establishment message includes the first protection key.

In the foregoing method, after an association request from the second node is received, the group key of the first communication group to which the second node belongs may be determined, then the group key is encrypted by using the shared key between the first node and the second node to obtain the first protection key, the first protection key is carried in an association establishment message, and the association establishment message is sent to the second node. It can be learned that, because a protection key carried in the association establishment message is obtained by encrypting the group key by using the shared key, privacy of the group key can be protected regardless of whether the first association establishment message is encrypted. In this way, when performing multicast communication with the first communication group, the first node may encrypt a multicast message by using the group key, to protect the multicast message, prevent a non-group member from obtaining communication content, and improve security of the multicast communication.

Further, the first node may send, in the association establishment message, the group key to the second node by using the protection key, and integrate a group key distribution procedure into a procedure of establishing an association between the first node and the second node. Therefore, no additional key distribution procedure is needed, which saves overheads of network resources and improves efficiency of multicast communication.

In a possible implementation of the first aspect, the first node and the second node share the shared key.

It can be learned that, the shared key is a secret value shared between the first node and the second node, and the shared key may be generated by the first node and the second node by using a same key obtaining method, or may be predefined or preconfigured on the first node and the second node, or may be sent by a trusted device to the first node and the second node separately. For example, the first node and the second node may generate a key S by exchanging public keys, and a value of the key S generated by the first node is the same as a value of the key S generated by the second node. Therefore, the key S may be used as the shared key between the first node and the second node. In addition, another key may be obtained based on an original shared key by using a key derivation function (KDF). Because the first node and the second node may derive a key by using a same method, a key derived based on the shared key is also a shared key.

In another possible implementation of the first aspect, the encrypting the group key of the first communication group based on a shared key between a first node and the second node, to obtain a first protection key includes:

encrypting the group key of the first communication group based on the shared key between the first node and the second node and a second freshness parameter, to obtain the first protection key.

The foregoing describes an encryption method. Because values of freshness parameters are different, the first protection key obtained by encrypting the group key of the first communication group each time is also different. This improves privacy of the group key.

In still another possible implementation of the first aspect, the encrypting the group key of the first communication group based on a shared key between a first node and the second node, to obtain a first protection key includes:

generating a first intermediate key based on the shared key between the first node and the second node and a second freshness parameter by using a first key derivation function KDF; and encrypting the group key of the first communication group by using the first intermediate key, to obtain the first protection key.

The foregoing describes still another encryption method. The first node generates the first intermediate key by using the shared key and the second freshness parameter, and encrypts the group key by using the first intermediate key.

In still another possible implementation of the first aspect, the encrypting the group key of the first communication group based on a shared key between a first node and the second node, to obtain a first protection key includes:

generating a first intermediate key based on the shared key between the first node and the second node and a second freshness parameter by using a first key derivation function KDF, where the first KDF is a KDF supported by the second node; and performing exclusive-OR processing on the first intermediate key and the group key of the first communication group, to obtain the first protection key.

The foregoing describes still another encryption method. The first node generates the first intermediate key by using the shared key and the second freshness parameter. Because an original value may be obtained after exclusive-OR processing is performed twice, the first node performs exclusive-OR on the first intermediate key and the group key of the first communication group. Further optionally, after receiving the first protection key, the second node generates a same first intermediate key based on the shared key and a value of the second freshness parameter, and performs exclusive-OR processing on the first intermediate key and the first protection key to obtain a key of the first communication group.

In still another possible implementation of the first aspect, the shared key is an encryption key between the first node and the second node, the second freshness parameter is a number once, and the first association establishment message includes the second freshness parameter.

The foregoing describes a possible case of the shared key and a freshness parameter. The encryption key between the first node and the second node may be shared. Therefore, the group key may be encrypted by using the encryption key between the first node and the second node. The second freshness parameter may be a number once (number once, NONCE). NONCE is a random value that is used only once (or non-repeatedly). The second freshness parameter may be sent to the second node in the first association establishment message, so that the second node decrypts the first protection key based on the second freshness parameter, to obtain the group key of the first communication group.

In still another possible implementation of the first aspect, the second freshness parameter is a value of a first counter, and the first counter is used to represent a quantity of times for encrypting the group key of the first communication group based on the shared key.

The foregoing describes a possible case of a freshness parameter. The second freshness parameter may be the value of the first counter, and the first counter is used to represent a quantity of times for encrypting the group key of the first communication group based on the shared key. In this way, each time the shared key is used to encrypt the group key, a value of a used counter is different, so that the first protection key obtained by encrypting the same group key of the first communication group each time is also different. This improves privacy of the group key.

In still another possible implementation of the first aspect, the determining a group key of a first communication group includes:

determining the group key of the first communication group based on the ID of the first communication group, where a correspondence exists between the ID of the first communication group and the group key of the first communication group; or generating the group key of the first communication group based on at least one of the first freshness parameter and the ID of the first communication group by using a second KDF.

The foregoing describes a manner of determining the group key of the first communication group. In one aspect, there is a correspondence between the ID of the first communication group and the group key. Therefore, the group key of the communication group may be determined based on the ID of the communication group. In another aspect, the group key of the first communication group may be generated by using a KDF. Further optionally, if the ID of the first communication group does not have a corresponding group key (for example, a new communication group is created), the group key of the first communication group may be generated by using the KDF.

In still another possible implementation of the first aspect, the method further includes:

determining a group security algorithm, where the group security algorithm is an algorithm supported by nodes in the first communication group, and the group security algorithm includes at least one of a group encryption algorithm, a group integrity protection algorithm, and a group KDF algorithm.

The first association establishment message further includes information used to indicate the group security algorithm.

It can be learned that the first association establishment message further includes the group security algorithm, and the security algorithm is determined in an algorithm supported by all nodes in the group.

In still another possible implementation of the first aspect, the group security algorithm is an algorithm with a highest priority in algorithms supported by nodes in the first communication group; or the determining a group security algorithm includes:

determining the group security algorithm based on an algorithm selection policy, where the algorithm selection policy includes at least one of a priority-based algorithm selection policy and a sequence-based algorithm selection policy.

In still another possible implementation of the first aspect, the group security algorithm includes a third KDF algorithm, and the method further includes:

generating a session key of the first communication group by using the third KDF algorithm based on types of the group key and the session key of the first communication group.

It can be learned that, by using a group KDF algorithm, the session key may be derived from the group key based on the type of the session key, and is used for encryption in a session process.

In still another possible implementation of the first aspect, the key type includes one or more of a signaling plane encryption key, a user plane encryption key, a signaling plane integrity protection key, or a user plane integrity protection key; or the type of the session key corresponds to a scenario in which the session key is applied.

In still another possible implementation of the first aspect, before the encrypting the group key of the first communication group based on a shared key between a first node and the second node, to obtain a protection key, the method further includes:

confirming that encryption is not enabled for a signaling plane message between the first node and the second node.

In still another possible implementation of the first aspect, the method further includes:

if encryption is enabled for the signaling plane message between the first node and the second node, sending a second association establishment message to the second node, where the second association establishment message includes the group key of the first communication group, and the second association establishment message belongs to the signaling plane message between the first node and the second node.

It can be learned that, different protection methods can be used when signaling plane encryption is enabled or disabled. Specifically, if it is determined that encryption is enabled for a signaling plane message, when encryption is enabled for the signaling plane, the group key may not be encrypted, but is protected by encrypting the signaling plane message. This avoids additional encrypted data calculation and improves group key distribution efficiency.

In still another possible implementation of the first aspect, the method includes:

determining that a condition for updating the group key of the first communication group is met;

determining a first key based on at least one of a third freshness parameter and the identifier ID of the first communication group;

encrypting the first key based on the shared key between the first node and the second node, to obtain a second protection key; and sending a key update message to the second node, where the key update message includes the second protection key.

In still another possible implementation of the first aspect, the first key is used to replace the group key of the first communication group.

The foregoing describes a manner of updating the group key. After it is determined that the condition for updating the group key is met, the first key may be determined, and after the first key is encrypted by using the shared key, the first key is sent to the second node by using the key update message. It can be learned that, because a protection key carried in the key update message is obtained by encrypting the first key by using the shared key, privacy of the first key can be protected regardless of whether the key update message is encrypted. Optionally, the key update message may be a multicast message sent by the first node to the second node in the first communication group, or may be a unicast message between the first node and the second node. Further optionally, when the key update message is a unicast message, the first node may further send a unicast message to another second node in the first communication group.

In still another possible implementation of the first aspect, the key update message is further used to indicate start time of the first key and a validity period of the first key, and the first key is applied within the validity period of the first key starting from the start time of the first key.

It can be learned that the key update message may indicate update time of a first target key and/or a validity period of the first target key, so that when to apply the first target key is determined as required.

In still another possible implementation of the first aspect, after the sending a key update message to the second node, the method further includes:

determining that an update acknowledgment message from at least one second node that belongs to the first communication group is received; and applying the first key at the start time of the first key.

In still another possible implementation of the first aspect, the determining that an update acknowledgment message from at least one second node that belongs to the first communication group is received includes:

determining that update acknowledgment messages from all second nodes that belong to the first communication group are received.

In still another possible implementation of the first aspect, the encrypting the first key based on the shared key between the first node and the second node, to obtain a second protection key includes:

encrypting the first key based on the shared key between the first node and the second node and a fourth freshness parameter, to obtain the second protection key.

The foregoing describes a method for encrypting the first key. Because values of freshness parameters are different, the second protection key obtained by encrypting the first key each time is also different. This improves privacy of the group key.

In still another possible implementation of the first aspect, the encrypting the first key based on the shared key between the first node and the second node, to obtain a second protection key includes:

generating a second intermediate key based on the shared key between the first node and the second node and a fourth freshness parameter by using the first key derivation function KDF; and encrypting the first key by using the second intermediate key, to obtain the second protection key.

In still another possible implementation of the first aspect, the encrypting the first key based on the shared key between the first node and the second node, to obtain a second protection key includes:

generating a second intermediate key based on the shared key between the first node and the second node and a second freshness parameter by using the first key derivation function KDF, where the first KDF is a KDF supported by the second node; and performing exclusive-OR processing on the second intermediate key and the first key, to obtain the second protection key.

In still another possible implementation of the first aspect, the condition for updating includes:

a difference between a frame number of a current communication frame and a marked frame number is greater than or equal to a first threshold, where the frame number of the current communication frame and the marked frame number are in a same round of counting cycle, and the marked frame number is a frame number on which key update needs to be performed or the marked frame number is a frame number of a communication frame encrypted for the first time by using the group key of the first communication group;

a difference between the marked frame number and the frame number of the current communication frame is less than or equal to a second threshold, where the frame number of the current communication frame is in a next round of counting cycle of the marked frame number, and the marked frame number is a frame number on which key update needs to be performed or the marked frame number is a frame number of a communication frame encrypted for the first time by using the group key of the first communication group;

a validity period of the group key of the first communication group expires or use duration of the group key of the first communication group reaches a third threshold; or the at least one second node in the first communication group leaves the first communication group.

The foregoing describes the condition for updating the group key. When one of the following conditions is met, it may be determined that the group key needs to be updated: Q A group freshness parameter (for example, a frame number) of an access point is about to be repeated or reversed (or exceeds a threshold before reversal). Q The validity period of the group key expires or the use duration of the group key exceeds a threshold. Q A member in a group changes.

According to a second aspect, the present disclosure provides a communication method, including:

sending an association request message to a first node;

receiving a first association establishment message from the first node, where the first association establishment message includes a first protection key; and obtaining a group key of a first communication group based on a shared key between the first node and a second node and the first protection key, where the first communication group is a communication group to which the second node belongs.

In a possible implementation of the second aspect, the first node and the second node share the shared key.

In another possible implementation of the second aspect, the obtaining a group key of a first communication group based on a shared key between the first node and a second node and the first protection key includes:

obtaining the group key of the first communication group based on the shared key between the first node and the second node, a second freshness parameter, and the first protection key.

In still another possible implementation of the second aspect, the obtaining a group key of a first communication group based on a shared key between the first node and a second node and the first protection key includes:

generating a first intermediate key based on the shared key between the first node and the second node and a second freshness parameter by using a first key derivation function KDF; and obtaining the group key of the first communication group based on the first intermediate key and the first protection key.

In still another possible implementation of the second aspect, the shared key is an encryption key between the first node and the second node, the second freshness parameter is a number once, and the first association establishment message includes the second freshness parameter.

In still another possible implementation of the second aspect, the second freshness parameter is a value of a first counter, and the first counter is used to represent a quantity of times for encrypting the group key of the first communication group based on the shared key.

In still another possible implementation of the second aspect, the first association establishment message further includes information used to indicate a group security algorithm, the group security algorithm is an algorithm supported by nodes in the first communication group, and the group security algorithm includes at least one of a group encryption algorithm, a group integrity protection algorithm, and a group KDF algorithm.

In still another possible implementation of the second aspect, the group security algorithm is an algorithm with a highest priority in algorithms supported by nodes in the first communication group; or the determining a group security algorithm corresponds to an algorithm selection policy, where the algorithm selection policy includes at least one of a priority-based algorithm selection policy and a sequence-based algorithm selection policy.

In still another possible implementation of the second aspect, the group security algorithm includes a third KDF algorithm, and the method further includes:

generating a session key of the first communication group by using the third KDF algorithm based on types of the group key and the session key of the first communication group.

In still another possible implementation of the second aspect, the key type includes one or more of a signaling plane encryption key, a user plane encryption key, a signaling plane integrity protection key, or a user plane integrity protection key; or the type of the session key corresponds to a scenario in which the session key is applied.

In still another possible implementation of the second aspect, before the obtaining a group key of a first communication group based on a shared key between the first node and a second node and the first protection key, the method further includes:

confirming that encryption is not enabled for a signaling plane message between the first node and the second node.

In still another possible implementation of the second aspect, the method further includes:

receiving a second association establishment message from the first node, where the second association establishment message includes the group key of the first communication group, and the second association establishment message belongs to the signaling plane message between the first node and the second node; and if encryption is enabled for the signaling plane message between the first node and the second node, obtaining the group key of the first communication group by using a signaling plane encryption key between the first node and the second node and the second association establishment message.

In still another possible implementation of the second aspect, the method further includes:

receiving a key update message from the first node, where the key update message includes a second protection key; and obtaining a first key based on the shared key between the first node and the second node and the second protection key.

In still another possible implementation of the second aspect, the first key is used to replace the group key of the first communication group.

In still another possible implementation of the second aspect, the key update message is further used to indicate start time of the first key and a validity period of the first key, and the first key is applied within the validity period of the first key starting from the start time of the first key.

In still another possible implementation of the second aspect, after the obtaining a first key based on the shared key between the first node and the second node and the second protection key, the method further includes:

sending an update acknowledgment message to the first node; and applying the first key at the start time of the first key.

In still another possible implementation of the second aspect, the obtaining a first key based on the shared key between the first node and the second node and the second protection key includes:

obtaining the first key based on the shared key between the first node and the second node, a fourth freshness parameter, and the second protection key.

According to a third aspect, the present disclosure provides a communication apparatus. The communication apparatus includes units configured to perform the method described in any one of the first aspect or the possible implementations of the first aspect.

In a possible implementation of the third aspect, the apparatus specifically includes:

a receiving unit, configured to receive an association request message from a second node;

a processing unit, configured to determine a group key of a first communication group, where the first communication group is a communication group to which the second node belongs, and the group key of the first communication group is determined based on at least one of a first freshness parameter and an identifier ID of the first communication group, where the processing unit is configured to encrypt the group key of the first communication group based on a shared key between a first node and the second node, to obtain a first protection key; and a sending unit, configured to send a first association establishment message to the second node, where the first association establishment message includes the first protection key.

In another possible implementation of the third aspect, the processing unit is specifically configured to:

encrypt the group key of the first communication group based on the shared key between the first node and the second node and a second freshness parameter, to obtain the first protection key.

In still another possible implementation of the third aspect, the processing unit is specifically configured to:

generate a first intermediate key based on the shared key between the first node and the second node and a second freshness parameter by using a first key derivation function KDF; and encrypt a first communication key by using the first intermediate key, to obtain the first protection key.

In still another possible implementation of the third aspect, the processing unit is specifically configured to:

generate a first intermediate key based on the shared key between the first node and the second node and a second freshness parameter by using a first key derivation function KDF, where the first KDF is a KDF supported by the second node; and perform exclusive-OR processing on the first intermediate key and the group key of the first communication group, to obtain the first protection key.

In still another possible implementation of the third aspect, the shared key is an encryption key between the first node and the second node, the second freshness parameter is a number once, and the first association establishment message includes the second freshness parameter.

In still another possible implementation of the third aspect, the second freshness parameter is a value of a first counter, and the first counter is used to represent a quantity of times for encrypting the group key of the first communication group based on the shared key.

In still another possible implementation of the third aspect, the processing unit is specifically configured to:

determine the group key of the first communication group based on the ID of the first communication group, where a correspondence exists between the ID of the first communication group and the group key of the first communication group; or generate the group key of the first communication group based on at least one of the first freshness parameter and the ID of the first communication group by using a second KDF.

In still another possible implementation of the third aspect, the processing unit is further configured to:

determine a group security algorithm, where the group security algorithm is an algorithm supported by nodes in the first communication group, and the group security algorithm includes at least one of a group encryption algorithm, a group integrity protection algorithm, and a group KDF algorithm.

The first association establishment message further includes information used to indicate the group security algorithm.

In still another possible implementation of the third aspect, the group security algorithm is an algorithm with a highest priority in algorithms supported by nodes in the first communication group; or the determining a group security algorithm includes:

determining the group security algorithm based on an algorithm selection policy, where the algorithm selection policy includes at least one of a priority-based algorithm selection policy and a sequence-based algorithm selection policy.

In still another possible implementation of the third aspect, the group security algorithm includes a third KDF algorithm, and the processing unit is further configured to:

generate a session key of the first communication group by using the third KDF algorithm based on types of the group key and the session key of the first communication group.

In still another possible implementation of the third aspect, the key type includes one or more of a signaling plane encryption key, a user plane encryption key, a signaling plane integrity protection key, or a user plane integrity protection key; or the type of the session key corresponds to a scenario in which the session key is applied.

In still another possible implementation of the third aspect, the processing unit is further configured to:

confirm that encryption is not enabled for a signaling plane message between the first node and the second node.

In still another possible implementation of the third aspect, encryption is enabled for the signaling plane message between the first node and the second node, and the sending unit is further configured to:

send a second association establishment message to the second node, where the second association establishment message includes the group key of the first communication group, and the second association establishment message belongs to the signaling plane message between the first node and the second node.

In still another possible implementation of the third aspect, the processing unit is further configured to determine that a condition for updating the group key of the first communication group is met.

The processing unit is further configured to determine a first key based on at least one of a third freshness parameter and the identifier ID of the first communication group.

The processing unit is further configured to encrypt the first key based on the shared key between the first node and the second node, to obtain a second protection key.

The sending unit is further configured to send a key update message to the second node. The key update message includes the second protection key.

In still another possible implementation of the third aspect, the first key is used to replace the group key of the first communication group.

In still another possible implementation of the third aspect, the key update message is further used to indicate start time of the first key and a validity period of the first key, and the first key is applied within the validity period of the first key starting from the start time of the first key.

In still another possible implementation of the third aspect, the processing unit is further configured to:

determine that an update acknowledgment message from at least one second node that belongs to the first communication group is received; and apply the first key at the start time of the first key.

In still another possible implementation of the third aspect, the processing unit is specifically configured to:

determine that update acknowledgment messages from all second nodes that belong to the first communication group are received.

In still another possible implementation of the third aspect, the processing unit is specifically configured to:

encrypt the key based on the shared key between the first node and the second node and a fourth freshness parameter, to obtain the second protection key.

In still another possible implementation of the third aspect, the condition for updating includes:

a difference between a frame number of a current communication frame and a marked frame number is greater than or equal to a first threshold, where the frame number of the current communication frame and the marked frame number are in a same round of counting cycle, and the marked frame number is a frame number on which key update needs to be performed or the marked frame number is a frame number of a communication frame encrypted for the first time by using the group key of the first communication group;

a difference between the marked frame number and the frame number of the current communication frame is less than or equal to a second threshold, where the frame number of the current communication frame is in a next round of counting cycle of the marked frame number, and the marked frame number is a frame number on which key update needs to be performed or the marked frame number is a frame number of a communication frame encrypted for the first time by using the group key of the first communication group;

a validity period of the group key of the first communication group expires or use duration of the group key of the first communication group reaches a third threshold; or the at least one second node in the first communication group leaves the first communication group.

According to a fourth aspect, the present disclosure provides a communication apparatus. The communication apparatus includes units configured to perform the method described in any one of the second aspect or the possible implementations of the second aspect.

In a possible implementation of the fourth aspect, the apparatus specifically includes:

a sending unit, configured to send an association request message to a first node;

a receiving unit, configured to receive a first association establishment message from the first node, where the first association establishment message includes a first protection key; and a processing unit, configured to obtain a group key of a first communication group based on a shared key between the first node and a second node and the first protection key, where the first communication group is a communication group to which the second node belongs.

In another possible implementation of the fourth aspect, the first node and the second node share the shared key.

In still another possible implementation of the fourth aspect, the processing unit is specifically configured to:

obtain the group key of the first communication group based on the shared key between the first node and the second node, a second freshness parameter, and the first protection key.

In still another possible implementation of the fourth aspect, the processing unit is specifically configured to:

generate a first intermediate key based on the shared key between the first node and the second node and a second freshness parameter by using a first key derivation function KDF; and obtain the group key of the first communication group based on the first intermediate key and the first protection key.

In still another possible implementation of the fourth aspect, the shared key is an encryption key between the first node and the second node, the second freshness parameter is a number once, and the first association establishment message includes the second freshness parameter.

In still another possible implementation of the fourth aspect, the second freshness parameter is a value of a first counter, and the first counter is used to represent a quantity of times for encrypting the group key of the first communication group based on the shared key.

In still another possible implementation of the fourth aspect, the first association establishment message further includes information used to indicate a group security algorithm, the group security algorithm is an algorithm supported by nodes in the first communication group, and the group security algorithm includes at least one of a group encryption algorithm, a group integrity protection algorithm, and a group KDF algorithm.

In still another possible implementation of the fourth aspect, the group security algorithm is an algorithm with a highest priority in algorithms supported by nodes in the first communication group; or the determining a group security algorithm corresponds to an algorithm selection policy, where the algorithm selection policy includes at least one of a priority-based algorithm selection policy and a sequence-based algorithm selection policy.

In still another possible implementation of the fourth aspect, the processing unit is further configured to:

generate a session key of the first communication group by using the third KDF algorithm based on types of the group key and the session key of the first communication group.

In still another possible implementation of the fourth aspect, the key type includes one or more of a signaling plane encryption key, a user plane encryption key, a signaling plane integrity protection key, or a user plane integrity protection key; or the type of the session key corresponds to a scenario in which the session key is applied.

In still another possible implementation of the fourth aspect, before the obtaining a group key of a first communication group based on a shared key between the first node and a second node and the first protection key, further including:

confirming that encryption is not enabled for a signaling plane message between the first node and the second node.

In still another possible implementation of the fourth aspect, the receiving unit is further configured to receive a second association establishment message from the first node, where the second association establishment message includes the group key of the first communication group, and the second association establishment message belongs to the signaling plane message between the first node and the second node; and the processing unit is further configured to decrypt the second association establishment message by using a signaling plane encryption key between the first node and the second node, to obtain the group key of the first communication group.

In still another possible implementation of the fourth aspect, the receiving unit is further configured to receive a key update message from the first node, where the key update message includes a second protection key; and the processing unit is further configured to obtain a first key based on the shared key between the first node and the second node and the second protection key.

In still another possible implementation of the fourth aspect, the first key is used to replace the group key of the first communication group.

In still another possible implementation of the fourth aspect, the key update message is further used to indicate start time of the first key and a validity period of the first key, and the first key is applied within the validity period of the first key starting from the start time of the first key.

In still another possible implementation of the fourth aspect, the processing unit is further configured to:

send an update acknowledgment message to the first node; and apply the first key at the start time of the first key.

In still another possible implementation of the fourth aspect, the processing unit is specifically configured to:

obtain the first key based on the shared key between the first node and the second node, a fourth freshness parameter, and the second protection key.

According to a fifth aspect, the present disclosure provides a communication apparatus. The communication apparatus includes at least one processor and a communication interface, the communication interface is configured to send and/or receive data, and the at least one processor is configured to invoke a computer program stored in at least one memory, so that the apparatus implements the method described in any one of the first aspect or the possible implementations of the first aspect, or the method described in any one of the second aspect or the possible implementations of the second aspect.

According to a sixth aspect, the present disclosure provides a communication system. The communication system includes a first node and a second node. The first node is the apparatus described in any one of the third aspect or the possible implementations of the third aspect, and the second node is the apparatus described in any one of the fourth aspect or the possible implementations of the fourth aspect.

According to a seventh aspect, the present disclosure provides a chip system. A communication apparatus of the chip system includes at least one processor and a communication interface, the communication interface is configured to send and/or receive data, and the at least one processor is configured to invoke a computer program stored in at least one memory, so that the apparatus in which the chip system is located implements the method described in any one of the first aspect or the possible implementations of the first aspect, or implements the method described in any one of the second aspect or the possible implementations of the second aspect.

According to an eighth aspect, the present disclosure provides a computer-readable storage medium. The computer-readable storage medium stores a computer program, and when the computer program runs on one or more processors, the method described in any one of the first aspect or the possible implementations of the first aspect, or any one of the second aspect or the possible implementations of the second aspect is performed.

According to a ninth aspect, the present disclosure provides a computer program product. When the computer program product runs on one or more processors, the method described in any one of the first aspect or the possible implementations of the first aspect, or any one of the second aspect or the possible implementations of the second aspect is performed.

According to a tenth aspect, the present disclosure provides a terminal. The terminal includes a first node (for example, an automobile cockpit domain controller (CDC)) and/or a second node (for example, at least one of modules such as a camera, a screen, a microphone, a speaker, radar, an electronic key, and a passive entry passive start system controller). The first node is the apparatus described in any one of the third aspect or the possible implementations of the third aspect, and the second node is the apparatus described in any one of the fourth aspect or the possible implementations of the fourth aspect.

Further optionally, the terminal may be a vehicle, an uncrewed aerial vehicle, a robot, a device in a smart home scenario, a device in a smart manufacturing scenario, or the like.

It may be understood that the technical solutions in the second aspect, the third aspect, and the fourth aspect of this application correspond to the technical solutions in the first aspect. For related beneficial effects, refer to the beneficial effects in the first aspect. Therefore, details are not described again.

BRIEF DESCRIPTION OF DRAWINGS

The following describes accompanying drawings used in embodiments of this application.

FIG. 6A and FIG. 6B are a schematic diagram of a method for determining a group security algorithm according to an embodiment;

DESCRIPTION OF EMBODIMENTS

Figure 1:
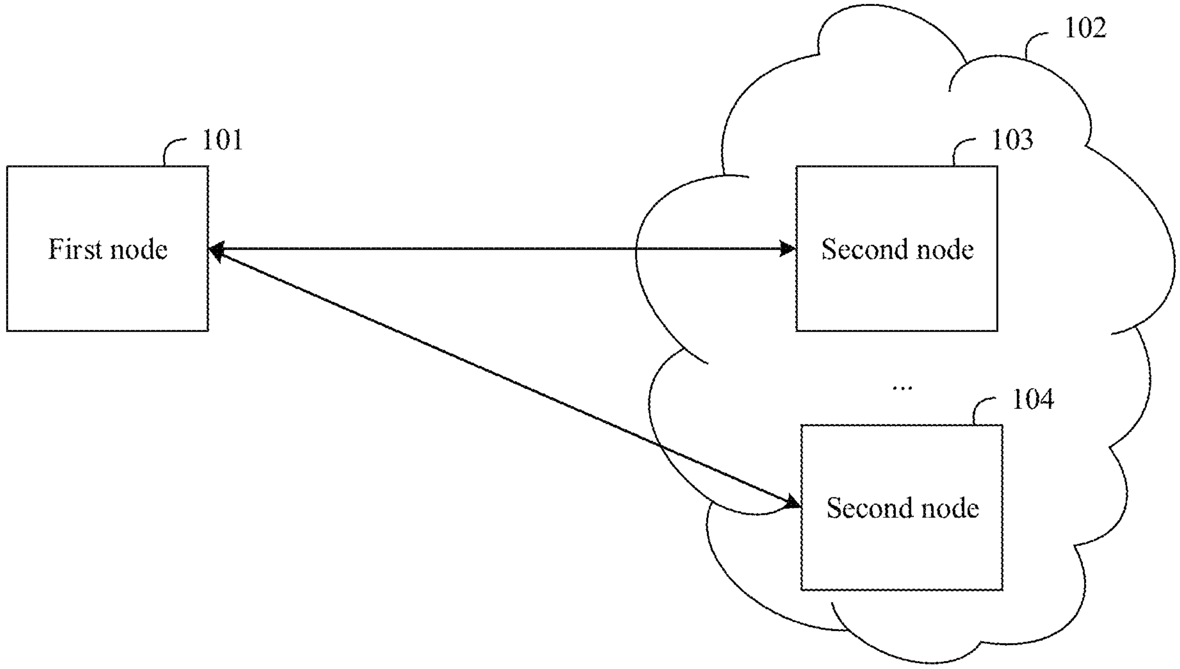
FIG. 1 is a schematic diagram of an architecture of a communication system according to an embodiment.

The following describes embodiments with reference to accompanying drawings. It should be noted that in this application, the word such as "example" or "for example" is used to represent giving an example, an illustration, or a description. Any embodiment or design solution described by using "example" or "for example" should not be explained as being more preferred or having more advantages than another embodiment or design scheme. Use of the word "example" or "for example" is intended to present a related concept in a specific manner.

The following first briefly describes related technologies and technical terms in this application for ease of understanding.

1. Node (Node)

The node is an electronic device that has a data receiving and sending capability. For example, the node may be a cockpit domain device, or a module (for example, one or more of modules such as a cockpit domain controller (CDC), a camera, a screen, a microphone, a speaker, an electronic key, and a passive entry passive start system controller) in the cockpit domain device. During specific implementation, the node may alternatively be a data transfer device, for example, a router, a repeater, a bridge, or a switch; or may be a terminal device, for example, various types of user equipment (UE), a mobile phone, a tablet computer (pad), a desktop computer, a headset, or a speaker; or may further include a machine intelligence device such as a self-driving device, a transportation safety device, a virtual reality (VR) terminal device, an augmented reality (AR) terminal device, a machine type communication (MTC) device, an industrial control device, a remote medical device, a smart grid device, or a smart city device, or may further include a wearable device (for example, a smart watch, a smart band, or a pedometer), or the like. In some technical scenarios, a name of a device with a similar data receiving and sending capability may not be node. However, for ease of description, electronic devices that have a data receiving and sending capability are collectively referred to as nodes in embodiments of this application.

2. Shared Key (SK)

The shared key is a same secret value stored in nodes of both communication parties. The shared key may be generated by both communication parties by using a same key obtaining method, or may be predefined or preconfigured in the nodes of both communication parties, or may be sent by a trusted device (for example, a key distribution center (KDC)) to a first node and a second node separately.

For example, a cockpit domain controller (CDC) of a vehicle and a mobile phone of a vehicle owner are two nodes that can communicate with each other by using a short-range communication technology. When the vehicle owner needs to perform pairing with the CDC of the vehicle by using the mobile phone, the vehicle owner may first generate a shared key by exchanging public keys, for example, generate a shared key by exchanging key agreement algorithm parameters between the mobile phone and the CDC of the vehicle by using a key agreement algorithm. The shared key may be used to verify identities of both nodes when the mobile phone subsequently requests pairing with the CDC of the vehicle again.

For another example, the cockpit domain controller (CDC) of the vehicle and a vehicle-mounted radar device are two nodes that can communicate with each other. When deploying the CDC and the vehicle-mounted radar, an employee of the automobile factory has preconfigured a shared key between the CDC and the vehicle-mounted radar. Security of communication between the CDC of the vehicle and the vehicle-mounted radar can be ensured by using the shared key.

In addition, a node may derive another key based on an original shared key through key derivation. Because the nodes of both parties may derive a key by using a same method, the key derived based on the original shared key may also be considered as a shared key. For example, the first node derives a session key Kenc by using a shared key Kdh, and correspondingly, the second node derives the session key Kenc by using the same method. Because the shared key Kdh is a secret value shared by the first node and the second node, the derived session key Kenc may also be considered as a shared key between the first node and the second node.

3. Multicast Communication

A multicast technology aims to send a piece of information to a group of nodes. In this way, the group of nodes can be considered as a communication group. In some scenarios, such a communication group is also referred to as a target group or a multicast group. When a node (for example, referred to as a first node) sends information to a plurality of target nodes, the first node may send only one piece of data, and a destination address of the data is a multicast group address. In this way, all target nodes belonging to the group can receive the foregoing data sent by the first node. Therefore, in a multicast mode, a problem of repeated data transmission and repeated bandwidth occupation in a unicast mode is resolved, and a waste of bandwidth resources in a broadcast mode is also resolved.

4. Security Algorithm

The security algorithm may include an encryption algorithm, an integrity protection algorithm, a key derivation function, and the like.

The encryption algorithm includes a symmetric encryption algorithm and an asymmetric encryption algorithm. Generally, an encryption key and a decryption key of the symmetric encryption algorithm are the same, and an encryption key and a decryption key of the asymmetric encryption algorithm are different. In addition, there is a hash algorithm that does not need a key. Common symmetric encryption algorithms mainly include data encryption standard (DES), triple data encryption algorithm (3DES), advanced encryption standard (AES), and the like. Common asymmetric encryption algorithms mainly include RSA encryption algorithm, data structure analysis (DSA) algorithm, and the like. Hash algorithms mainly include secure hash algorithm (such as secure hash algorithm 1, i.e. SHA-1), message digest (MD) algorithm (such as MD2, MD4, or MD5), and the like.

The integrity protection algorithm is an algorithm used to protect message integrity, and may also be referred to as a message authentication code (MAC) algorithm. For example, an integrity protection algorithm implemented by using a hash algorithm is referred to as a hash-based message authentication code (HMAC) algorithm, where the hash algorithm may be one of MD5, SHA-1, SHA-256, and the like, and these different HMAC implementations are generally marked as: HMAC-MD5, HMAC-SHA1, HMAC-SHA256, and the like. For another example, a MAC algorithm implemented based on a cryptographic algorithm may be referred to as a cipher-based message authentication code (CMAC) algorithm, where the cryptographic algorithm may be AES. Because there are four working modes of AES block encryption: ECB, CBC, CFB, and OFB, integrity protection algorithms implemented based on block encryption algorithms in different working modes may be respectively referred to as an ECB-MAC algorithm, a CBC-MAC algorithm, and the like. Further, a one-key message authentication code (One-key CBC-MAC, OMAC) is improved from the CBC-MAC algorithm. In addition, the integrity protection algorithm may further include a Galois message authentication code (GMAC), a ZUC cryptographic algorithm (such as ZUC128 and ZUC256), and the MD algorithm (such as MD2, MD4, or MD5).

In some specific scenarios, by using an authentication encryption algorithm, data may be encrypted for a given original text and a message authentication code may be generated for the given original text. Therefore, the authentication encryption algorithm may be used as the encryption algorithm or the integrity protection algorithm. For example, an AES algorithm based on a GMAC and a count encryption mode (AES-Galois/counter mode, AES-GCM) and an AES algorithm based on a CMAC and a count encryption mode (AES-CMAC/counter Mode, AES-CCM) may perform authentication encryption on a message, and a MAC can be generated in a process of performing authentication encryption to protect integrity of the message.

The key derivation function (KDF) is used to derive one or more secret values from a secret value, and is also referred to as a key derivation algorithm. For example, a new secret value DK derived from a secret value Key may be represented as follows: DK=KDF (Key). Common key derivation algorithms include a password-based key derivation function (PBKDF), a scrypt algorithm, and the like. The PBKDF algorithm further includes a first-generation PBKDF1 and a second-generation PBKDF2. Optionally, in a key derivation process of some KDF algorithms, a hash algorithm is used to perform a hash change on an input secret value. Therefore, an algorithm identifier may be further received as an input in the KDF function, to indicate a hash algorithm to be used.

It should be noted herein that, in embodiments of this application, to facilitate description of KDFs used in key derivation processes, "first KDF", "second KDF", and "third KDF" are used for description. The "first KDF", "second KDF", and "third KDF" may be different KDFs, or may be a same KDF.

5. Freshness Parameter

The freshness parameter is used to generate a key, an authentication parameter, and the like, may also be referred to as a freshness or freshness parameter, and may include at least one of a number once (NONCE), a counter, a serial number (number), a frame number, and the like. NONCE is a random value that is used only once (or non-repeatedly). Freshness parameters generated at different moments are usually different. In other words, a specific value of a freshness parameter changes each time a freshness parameter is generated. Therefore, a freshness parameter used to generate a key (or an authentication parameter, or the like) this time is different from a freshness parameter used to generate a key (or an authentication parameter, or the like) last time. This can improve security of the generated key.

For example, the freshness parameter may be a random number obtained by a node by using a random number generator.

For another example, the freshness parameter may be a packet data convergence protocol count (PDCP COUNT), and the PDCP COUNT may further include an uplink PDCP COUNT and a downlink PDCP COUNT. The uplink PDCP COUNT is increased by 1 each time the second node sends an uplink PDCP data packet, and the downlink PDCP COUNT is increased by 1 each time the first node sends a downlink PDCP data packet. Because the PDCP COUNT keeps changing, a key generated each time by using the PDCP COUNT is different from a key generated last time by using the PDCP COUNT.

6. Frame Number

A protocol data unit (PDU) is a data unit transmitted between peer layers during communication. In a protocol stack of a communication system, an entity at each layer can establish a PDU for the entity at the layer. The PDU contains information from an entity at the upper layer and additional information of the entity at the current layer, and then is transmitted to the next layer. In some scenarios, information about the entity at the current layer may not be attached, for example, transparent transmission. For example, for two sublayers: logical link control (LLC) and media access control (MAC), an LLC entity may establish an LLC PDU, and a MAC entity may establish a MAC PDU. For ease of description, protocol data units transferred in the communication system are collectively referred to as communication frames in embodiments of this application. Specifically, a control-type protocol data unit may also be referred to as a control frame or a management frame, and a data-type protocol data unit may also be referred to as a data frame. For example, the communication frame may be a media access control (MAC) data frame.

A communication frame received and sent by a node by using a network has a corresponding serial number (SN), which is also referred to as a sequence number. A value of the serial number is indicated by using n bits, and a serial number of a next communication frame is a serial number of a previous communication frame plus 1. For example, assuming that a value of a serial number of a communication frame A is 192, a value of a serial number of a next communication frame B is 193, and so on. It should be noted that when a serial number rollover (SN rollover) occurs because the serial number exceeds a maximum representation value, a serial number value of a subsequent communication frame is less than a serial number of a previous communication frame. For example, a serial number is 8 bits. A serial number of the first communication frame is 0 and is increased by 1 each time. Each time the serial number increases to 0xFF, a serial number rollover occurs. In other words, a serial number has a periodic characteristic. For a serial number including n bits, the serial number is repeated each time $2^n$ communication frames pass through. Therefore, the communication frame does not have a unique serial number, but is unique in each serial number cycle (SN cycle).

In embodiments of this application, a frame number (FN) is indicated by using N bits. The N bits include low-order n bits used to indicate a bit of a serial number of a communication frame, and high-order (N-n) bits used to indicate a bit of a record value. An initial value of the record value is 0 or a specified value, and when a rollover (rollover) occurs on the serial number of the communication frame, the record value is increased by 1. For example, the frame number is 32 bits, and the serial number is 8 bits. Assuming that the record value is 0x00 0000, and the value of the serial number of the communication frame is 0xFF, a current frame number is 0x0000 00FF. A value of a serial number of a next data packet is reversed after being increased by 1. Therefore, a value of a serial number of a next protocol data unit is 0x00. Because a rollover occurs on the serial number, the record value changes to 0x00 0001. Therefore, the next frame number is 0x0000 0100. It may be understood that, because the frame number is a number of N bits, the frame number also has a counting cycle (FN cycle). When the frame number exceeds a maximum value, a frame number rollover (FN rollover) also occurs.

Optionally, for setting of the frame number, refer to a related definition of the PCDP COUNT. The PCDP COUNT includes a hyper frame number (HFN) part and a serial number part of a protocol data unit. A start value of the hyper frame number is set to 0 or a specified value, and when a rollover occurs on the serial number of the protocol data unit, the hyper frame number is increased by 1.

Optionally, a node may maintain a plurality of frame numbers. For example, the node may separately maintain a frame number of an uplink communication frame and a frame number of a downlink communication frame. When sending an uplink communication frame, the node may increase the frame number of the uplink communication by 1 based on a serial number change of the communication frame. When sending a downlink communication frame, the node may adjust the frame number of the downlink communication frame based on a serial number change of the communication frame.

The following describes a system architecture and a service scenario in embodiments of this application. It should be noted that the system architecture and the service scenario described in this application are intended to describe the technical solutions in this application more clearly, and do not constitute a limitation on the technical solutions provided in this application. A person of ordinary skill in the art may know that with evolution of the system architecture and emergence of new service scenarios, the technical solutions provided in this application are also applicable to similar technical problems.

FIG. 1 is a schematic diagram of an architecture of a communication system according to an embodiment of this application. The communication system includes a first node 101, a first communication group 102, a second node 103, and a second node 104.

The first communication group 102 includes a plurality of second nodes, and both the second node 103 and the second node 104 are nodes that belong to the first communication group 103. It may be understood that the first communication group 102 may include one second node, or may include a plurality of second nodes. Herein, only an example in which the first communication group 102 includes two second nodes is used for description. This is not limited in this application. Optionally, the first node 101 may also be referred to as a primary node or an access point (AP). Correspondingly, the second node 103 or the second node 104 in the first communication group 102 may be referred to as a secondary node.

The first node 101 may perform multicast communication with a node in the first communication group 102, or may perform unicast communication with the second node 103 (or the second node 104) in the first communication group. Optionally, a communication data link may include various types of connection media, for example, may be a long-range connection technology, including radio access type technologies such as global system for mobile communications (GSM), general packet radio service (GPRS), and universal mobile telecommunications system (UMTS); and for another example, may be a short-range connection technology, including 802.11b/g, Bluetooth, Zigbee, a radio frequency identification (RFID) technology, an ultra-wideband (UWB) technology, an in-vehicle wireless short-range transmission technology, and the like. Certainly, there is another technology that may be used to support communication between the first node 101 and the second node.

The first node 101 may perform multicast communication with the plurality of second nodes in the first communication group 102, and a communication message needs to be encrypted, so as to ensure that only a member in the group can interpret an encrypted packet, and a non-group member cannot obtain packet content, thereby protecting security of the multicast communication. For the second node 103 in the group, the first node 101 needs to send a group key to the second node 103, so that the second node 103 decrypts a multicast message by using the group key.

The first node 101 may encrypt a signaling message including the group key by using a signaling plane encryption key (for example, a unicast key PTK between the first node 101 and the second node 103), and send the encrypted signaling message to the second node 103.

It should be noted that, for ease of description, the second node 103 is used as an example for description herein. For the second node 104 in the group, the first node 101 also needs to send the group key to the second node 104, so that the second node 104 decrypts the multicast message by using the group key.

Figure 2:
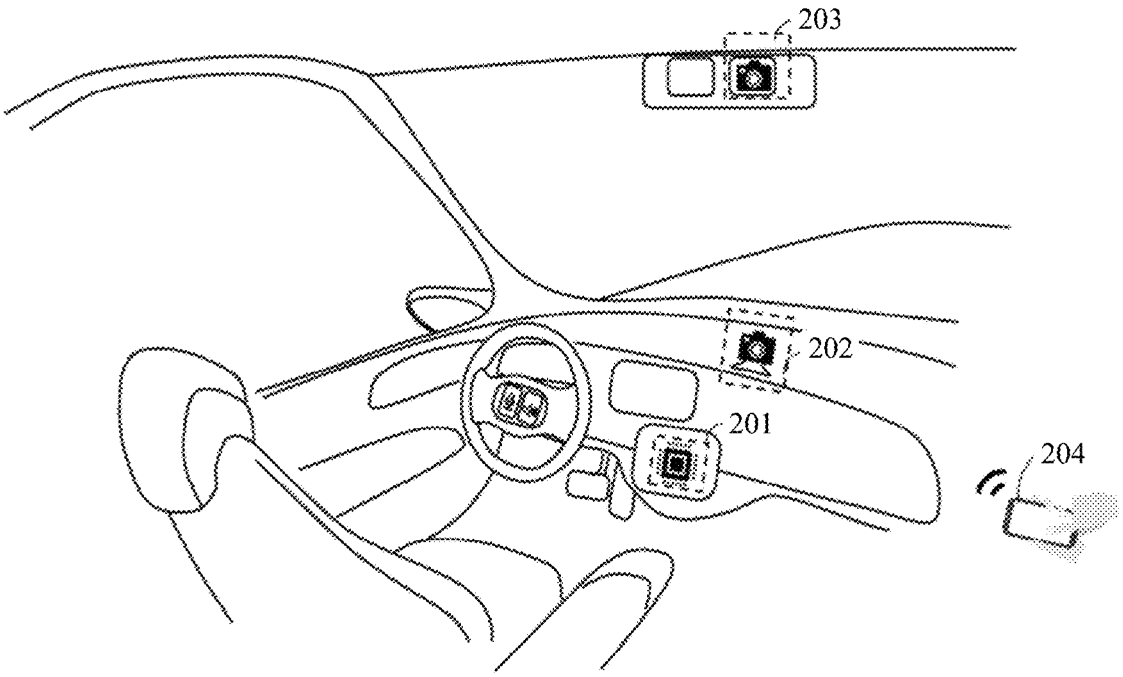
FIG. 2 is a schematic diagram of an application scenario of a communication method according to an embodiment.

For example, FIG. 2 is a schematic diagram of an application scenario of a communication method according to an embodiment of this application. A cockpit domain controller (CDC) 201 of a vehicle is a control center in a smart cockpit device, and may be considered as the first node 101. A camera 202 and a camera 203 are vehicle camera devices. For ease of control, the camera 202 and the camera 203 are configured as a communication group. The CDC 201 may perform multicast communication with the camera 202 and the camera 203 by using a wireless fidelity (Wi-Fi) technology. Before the multicast communication, the CDC 201 may encrypt a signaling message including a group key by using a signaling plane encryption key of the CDC 201 and the camera 203, and then send the encrypted signaling message to the camera 203. Correspondingly, the CDC 201 may encrypt the signaling message including the group key by using the signaling plane encryption key of the CDC 201 and the camera 203, and then send the encrypted signaling message to the camera 202.

However, in the foregoing method, the group key is protected depending on encryption of a signaling plane message. In a case in which encryption is not enabled for the signaling plane message, the group key cannot be protected, and this may cause group key leakage.

For example, refer to FIG. 2. An attack device 204 may listen to multicast communication. If encryption is not enabled for the signaling plane message, an attacker obtains the group key by listening to the signaling message carrying the group key, and then steals or listens to content of the multicast communication, or even initiates an attack to the CDC 201, threatening vehicle safety.

Figure 3:
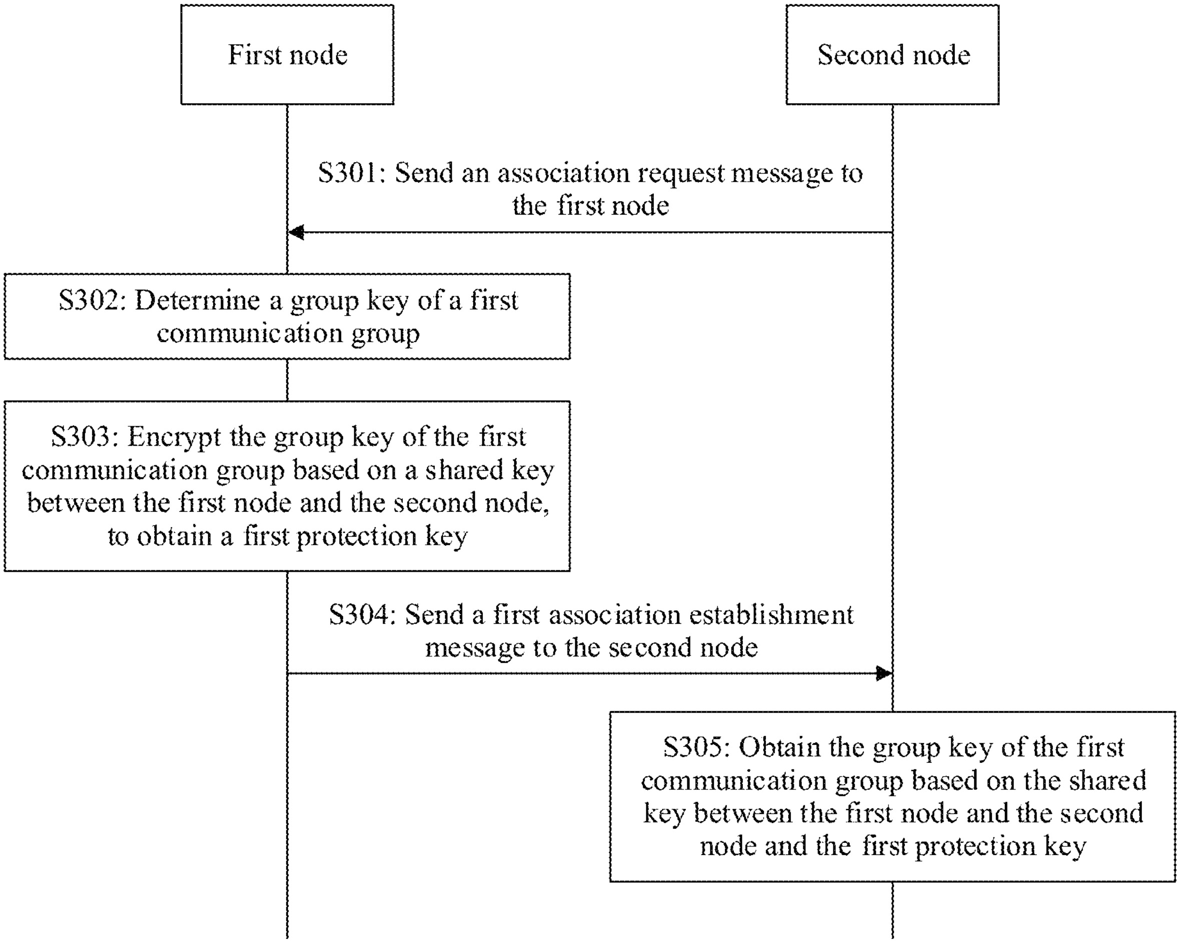
FIG. 3 is a flowchart of a communication method according to an embodiment.

FIG. 3 is a schematic flowchart of a communication method according to an embodiment of this application. The method may be implemented based on the architecture shown in FIG. 1. The method includes but is not limited to the following steps.

Step S301: A second node sends an association request message to a first node.

Specifically, the second node may send a first association request message to the first node by using a wireless link (for example, one of Wi-Fi, Bluetooth, ZigBee, or another short-range wireless link such as an in-vehicle short-range wireless communication link) or a wired link (for example, an optical fiber). Correspondingly, the first node receives the first association request message from the second node.

Optionally, the association request message may include a device identifier of the second node. A device identifier of a node may be an identity (ID), a media access control (MAC) address, a domain name, a domain address, or another user-defined identifier.

In the method, the first node may send an access message or a broadcast message, and the second node receives the access message or the broadcast message from the first node. The second node sends the first association request message to the first node based on the access message or the broadcast message. Specifically, the access message or the broadcast message of the first node may include at least one of an identity of the first node, description information of the first node, information used to indicate access of another node, or the like.

Optionally, the first association request message may further include information about a security algorithm supported by the second node (or security capabilities (Sec Capabilities) of the second node). The information about the security algorithm may be a name, an identifier, a predefined symbol, or the like of the security algorithm. The information about the security algorithm supported by the second node may be used by the first node to determine one or more of a security algorithm (or a unicast security algorithm) between the first node and the second node, a group security algorithm of a first communication group, and the like.

Further optionally, after receiving the association request message from the first node, the second node may send a security context request message to the second node. The security context request message includes information about the unicast security algorithm determined by the first node and first identity authentication information, and the first identity authentication information is used by the second node to authenticate an identity of the first node. Further, the second node may feed back a security context response message to the first node. The security context response message includes second identity authentication information, and the second identity authentication information is used by the first node to verify an identity of the second node.

Step S302: The first node determines a group key of the first communication group.

Specifically, the first communication group is a communication group to which the second node belongs. Optionally, the first node may obtain the device identifier of the second node in advance, so as to determine, based on the device identifier of the second node, a communication group to which the second node belongs. That is, there is a correspondence between the device identifier of the second node and a communication group. For example, for the correspondence, refer to Table 1. Table 1 is a possible communication group information table provided in this embodiment of this application. A correspondence displayed in the communication group information table may be preconfigured or predefined on the first node. A specific configuration and definition manner is not limited to a table manner, so that the correspondence can be reflected. The communication group information table includes an ID of the communication group and nodes included in the communication group. Optionally, information such as a group key or a group algorithm of the communication group may be further included. The first node may determine, based on the device identifier of the second node, the group key of the first communication group in which the first node is located. For example, if the device identifier of the second node is "E0", the first node determines a group key of a communication group whose ID is "GID1".

TABLE 1

Communication group information table

| Communication group ID | Included nodes | Group key | Group algorithm |
|---|---|---|---|
| GID1 | E0, E1, E2 | GK1 | — |
| GID2 | E3, E4 | GK2 | Integrity protection algorithm: ZUC |
| GID3 | E5, E6, E7 | GK3 | Integrity protection algorithm: AES-CCM |
| GID4 | E6, E7, E8 | — | — |

Optionally, the first node may determine or obtain the group key of the first communication group by using at least the following methods:

Method 1: The first node determines the group key of the first communication group based on an ID of the first communication group, where a correspondence exists between the ID of the first communication group and the group key of the first communication group. Specifically, a correspondence between an ID and a group key of a communication group is predefined or preconfigured on the first node. Therefore, the first node may determine the group key of the first communication group based on the ID of the first communication group. For example, refer to Table 1. The first node may determine, based on the ID "GID1" of the communication group, that the group key of the communication group is "GK1".

Method 2: The first node obtains a number once NONCEa, and uses NONCEa as the group key of the first communication group.

Method 3: The first node generates the group key of the first communication group based on at least one of a first freshness parameter and the ID of the first communication group by using a second KDF. The first freshness parameter is a freshness parameter obtained (or generated) by the first node, and there may be one or more first freshness parameters. Optionally, the second KDF may be a KDF algorithm with a highest priority on the first node. That the first node generates the group key of the first communication group based on at least one of a first freshness parameter and the ID of the first communication group by using a second KDF may specifically include the following implementations:

Implementation 1: The first node generates the group key of the first communication group based on the first freshness parameter and the ID of the first communication group by using the second KDF. For example, the first freshness parameter is a freshness parameter NONCEg and the ID of the first communication group is a GID. The generated group key of the first communication group meets the following formula: GK=second KDF (NONCEg, GID).

Implementation 2: The first node generates the group key of the first communication group based on the first freshness parameter by using the second KDF. For example, the first freshness parameter is a freshness parameter NONCEg1 and a freshness parameter NONCEg2, and the ID of the first communication group is a GID. The generated group key of the first communication group meets the following formula: GK=KDF (NONCEg1, NONCEg2).

Implementation 3: The first node generates the group key of the first communication group based on the group ID of the first communication group by using the second KDF. For example, the generated group key of the first communication group meets the following formula: GK=KDF (GID).

Optionally, parameters participating in GK generation may further include other information, for example, one or more of a length of a generated key, an identifier of a used hash algorithm, and the like.

Optionally, the first node may generate an identifier of the group key GK: GK ID. Further, the first node may further establish a correspondence between the GK ID and the ID of the first communication group, so that a corresponding GK ID may be determined based on the ID of the first communication group when the group key is determined next time, to obtain the group key GK indicated by the GK ID.

It should be noted that, before determining the group key of the first communication group, the first node may first determine whether the first communication group has a corresponding group key. If the corresponding group key exists, the group key of the first communication group is determined by using the method described in Method 1; or if the corresponding group key does not exist, the group key of the first communication group is determined by using the method described in Method 2 or Method 3. For example, when a new communication group is created, because the new communication group does not have a corresponding group key, the group key of the first communication group may be determined by using the method described in Method 2 or Method 3.

Step S303: The first node encrypts the group key of the first communication group based on a shared key between the first node and the second node, to obtain a first protection key.

Specifically, the shared key is a secret value shared between the first node and the second node. For example, the first node and the second node may generate a key S by exchanging public keys, and a value of the key S generated by the first node is the same as a value of the key S generated by the second node. Therefore, the key S may be used as the shared key between the first node and the second node.

Figure 4:
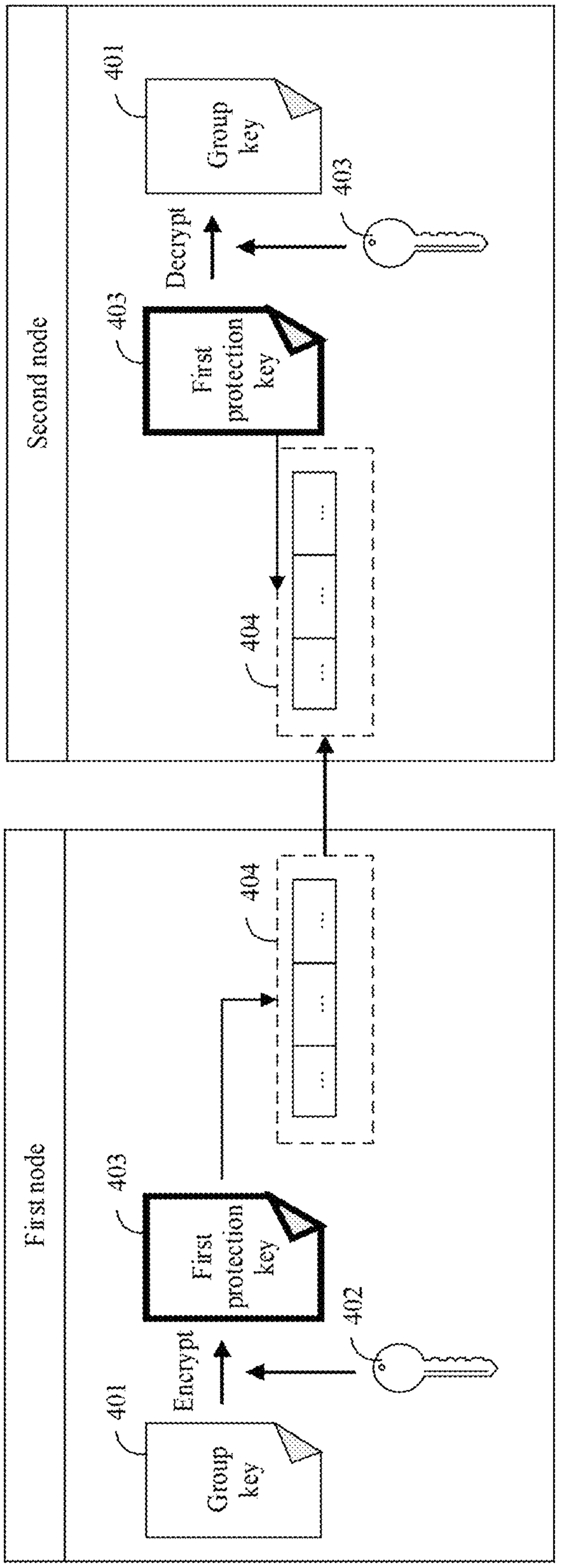
FIG. 4 is a schematic diagram of a method for encrypting a group key according to an embodiment.

Optionally, that the first node encrypts the group key of the first communication group based on a shared key between the first node and the second node may include at least the following several implementation solutions:

Implementation solution 1: The first node encrypts the group key by using the shared key, to obtain the first protection key. For example, refer to FIG. 4. FIG. 4 is a possible schematic diagram of encrypting a group key according to an embodiment of this application. A first node encrypts a group key 401 of a first communication group by using a shared key 402, to obtain a first protection key 403.

Optionally, the shared key may be a unicast key between the first node and a second node. For example, the first node encrypts the group key of the first communication group by using a unicast encryption key and based on a unicast encryption algorithm.

Implementation solution 2: The first node may encrypt the group key by using the shared key and a second freshness parameter, to obtain the first protection key. The second freshness parameter is one or more of a NONCE, a counter value, a frame number, and the like that are obtained (or generated) by the first node. For example, the second freshness parameter may be a number once NONCEk generated by the first node, or may be a public key exchanged between the first node and the second node. Because values of freshness parameters are different, the first protection key obtained by encrypting the same group key of the first communication group each time is also different. This improves privacy of the group key. The counter is used to represent a quantity of times for encrypting the group key of the first communication group based on the shared key.

Figure 5:
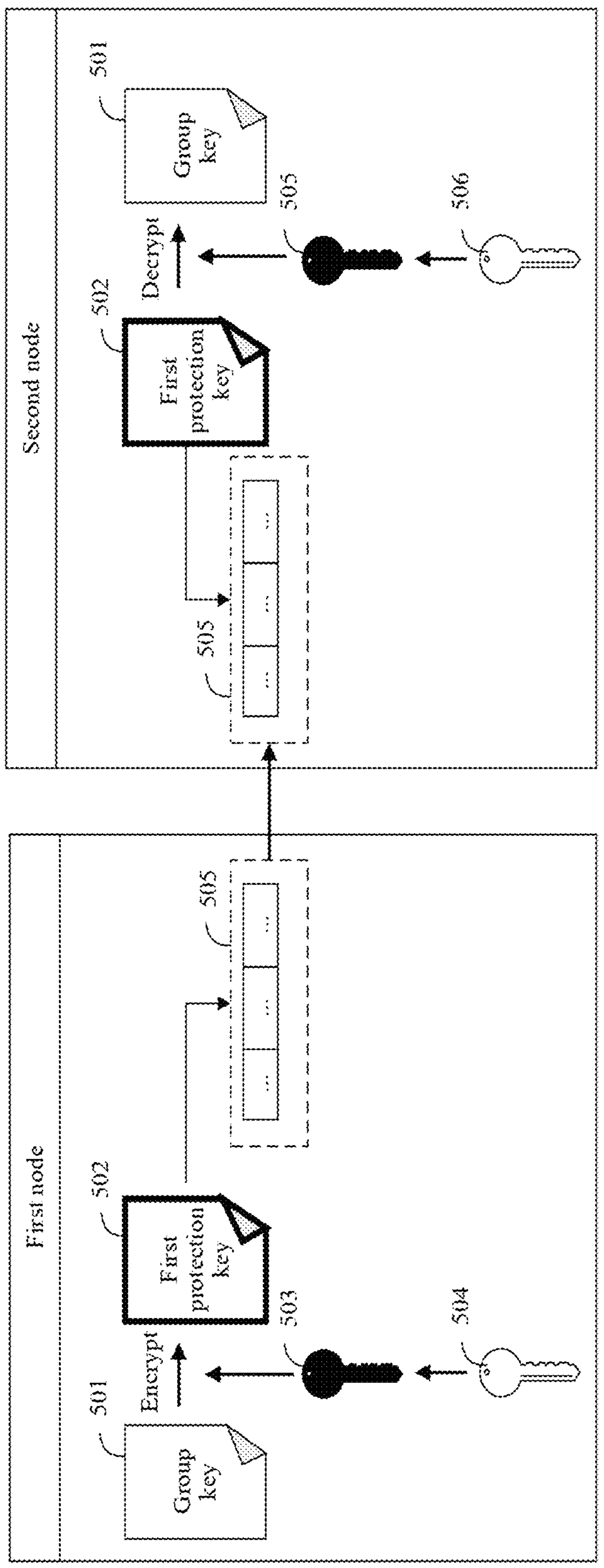
FIG. 5 is a schematic diagram of another method for encrypting a group key according to an embodiment.

Implementation solution 3: The first node generates a first intermediate key based on the shared key, and encrypts the group key by using the first intermediate key, to obtain the first protection key. For example, refer to FIG. 5. FIG. 5 is a possible schematic diagram of encrypting a group key according to an embodiment of this application. A first node generates a first intermediate key 503 based on a shared key 504, and encrypts a group key 501 by using the first intermediate key 503, to obtain a first protection key 502.

Implementation solution 4: The first node generates the first intermediate key based on the shared key and the second freshness parameter, and encrypts the group key by using the first intermediate key, to obtain the first protection key.

For example, the first node generates a first intermediate key Kg based on a shared key Kdh and a value counter1 of the first counter by using a first KDF, for example, Kg=first KDF (kdh, counter1). The first counter may be used to represent a quantity of times that the first node generates the first intermediate key Kg based on the shared key Kdh. It should be noted herein that, because the generated first intermediate key Kg is used to encrypt the group key of the first communication group, a quantity of times for generating an intermediate key may also represent a quantity of times for encrypting the group key. For example, the counter value starts from 1. When the first intermediate key is generated based on the shared key Kdh and the value counter1 of the first counter for the first time, the counter value is 1. Correspondingly, when the first intermediate key Kg is generated based on the shared key Kdh and the value counter1 of the first counter for the second time, the counter1 is 2. Further optionally, when the value of the first counter is greater than or equal to a predefined or preset threshold, the first node may update the shared key Kdh, and after Kdh is updated, the first counter may restart counting.

In a possible design, if the generated first intermediate key fails to encrypt the group key of the first communication group, or the group key of the first communication group fails to be sent, a value of the first counter that re-participates in generation of the first intermediate key may be a previous value of the counter.

For another example, the first node generates the first intermediate key Kg based on a session key Kenc and the number once NONCEk by using the first KDF, for example, Kg=first KDF (Kenc, NONCEk), and then encrypts the group key of the first communication group by using the Kg, to obtain the first protection key. For another example, the first node generates the first intermediate key Kg based on a shared key Kgt (the shared key Kgt may be specifically derived from the shared key Kdh) and a number once NONCK (or a counter value counter) by using the first KDF, for example, Kg=first KDF (Kenc, NONCEk (or counter)), and then encrypts the group key of the first communication group by using the Kg, to obtain the first protection key.

That the first node encrypts the group key of the first communication group by using the first intermediate key may be specifically as follows: The first node performs exclusive-OR processing on the group key of the first communication group and the first intermediate key to obtain the first protection key. For example, a first protection key GKc obtained by the first node through encryption may meet the following formula: $GKc=GK \oplus Kg$, where GK is the group key of the first communication group, $\oplus$ is exclusive-OR processing, and Kg is the first intermediate key. Because an original value may be obtained after exclusive-OR processing is performed twice, the first node performs exclusive-OR processing on the first intermediate key and the group key of the first communication group. After receiving the first protection key, the second node may generate the same first intermediate key, and perform exclusive-OR processing on the first intermediate key and the first protection key to obtain a key of the first communication group. It may be understood that "exclusive OR" may be a specific encryption processing manner.

Optionally, the first node may determine that encryption is not enabled for a signaling plane message between the first node and the second node, and encrypt the group key of the first communication group to obtain the first protection key when encryption is not enabled for the signaling plane message. If encryption is enabled for the signaling plane message between the first node and the second node, the first node sends a second association establishment message to the second node. The second association establishment message includes the group key of the first communication group. Because the second association establishment message belongs to the signaling plane message between the first node and the second node, the group key may be protected by encrypting the signaling plane message.

Step S304: The first node sends a first association establishment message to the second node.

It may be understood that the first node sends the first association establishment message to the second node, and correspondingly, the second node receives the first association establishment message from the first node. The association establishment message includes the first protection key. For example, refer to FIG. 4. The first node sends a first association establishment message 404 to the second node, and the second node receives the association establishment message 404 from the first node. For another example, refer to FIG. 5. The first node sends a first association establishment message 505 to the second node, and the second node receives the association establishment message 505 from the first node.

Optionally, the first association establishment message may further include the second freshness parameter, and the second freshness parameter may be used by the second node to decrypt the first protection key.

Further optionally, when the second freshness parameter is the value of the counter, the second node may also obtain a counter value corresponding to a value of a counter on the first node. Therefore, the first association establishment message may not include the second freshness parameter. For example, a value of a first counter on the first node is used as the second freshness parameter, and the value of the first counter represents a quantity of times for encrypting the group key. The second node also obtains a value of a second counter, the value of the second counter is used to represent a quantity of times for decrypting the group key, and the value of the second counter is corresponding to the value of the first counter. Therefore, the first association establishment message may not include the second freshness parameter.

Optionally, the first association establishment message further includes message authentication code, and the message authentication code is used by the second node to authenticate integrity of the first association establishment message.

Further optionally, the first node may encrypt the first association establishment message by using an encryption key. Correspondingly, the second node may decrypt the first association establishment message by using a corresponding decryption key, to obtain content in the first association establishment message.

Step S305: The second node obtains the group key of the first communication group based on the shared key between the first node and the second node and the first protection key. Optionally, the second node may decrypt the first protection key based on the shared key between the first node and the second node, to obtain the group key of the first communication group.

Specifically, the shared key is a secret value shared between the first node and the second node. Therefore, the second node may decrypt the first protection key by using the shared key, to obtain the group key of the first communication group.

Optionally, corresponding to the manner in which the first node encrypts the group key, that the second node decrypts the first protection key based on the shared key between the first node and the second node may include at least the following several implementation solutions:

Implementation solution 1: The second node decrypts the first protection key by using the shared key, to obtain the group key of the first communication group. For example, refer to FIG. 4. The first node decrypts the first protection key 403 by using the shared key 402, to obtain the group key 401 of the first communication group.

Implementation solution 2: The second node may decrypt the first protection key by using the shared key and the second freshness parameter, to obtain the group key of the first communication group.

Implementation solution 3: The second node generates the first intermediate key based on the shared key, and decrypts the first protection key by using the first intermediate key, to obtain the group key of the first communication group. For example, refer to FIG. 5. The second node generates the first intermediate key 503 based on the shared key 504, and decrypts the first protection key 502 by using the first intermediate key 503, to obtain the group key 501 of the first communication group.

Implementation solution 4: The second node generates the first intermediate key based on the shared key and the second freshness parameter, and decrypts the first protection key by using the first intermediate key, to obtain the group key of the first communication group. For example, the second node generates the first intermediate key Kg based on the shared key Kdh and the value counter1 of the first counter by using the first KDF, for example, Kg=first KDF (kdh, counter1). The first counter may be used to represent a quantity of times that the first node generates the first intermediate key Kg based on the shared key Kdh. For another example, the second node generates the first intermediate key Kg based on the session key Kenc and the second freshness parameter NONCEk by using the first KDF, for example, Kg=first KDF (Kenc, NONCEk). For another example, the first node generates the first intermediate key Kg based on the shared key Kgt and the number once NONCK (or the counter value counter) by using the first KDF, for example, Kg=first KDF (Kenc, NONCEk (or counter)).

Optionally, that the second node decrypts the first protection key by using the first intermediate key may be specifically as follows: The second node performs exclusive-OR processing on the first protection key and the first intermediate key to obtain the group key of the first communication group. For example, the second node decrypts the first protection key GKc to obtain the group key GK of the first communication group, which may meet the following formula: $GK=GKc\oplus Kg$.

Optionally, the second node may further send an association complete message to the first node. The association complete message is used to indicate that an association is successfully established for the first node. Optionally, the second node may encrypt the association complete message by using an encryption key. Correspondingly, the first node may decrypt the association complete message by using a corresponding decryption key, to obtain data content in the association complete message. Optionally, the association complete message includes message authentication code, and the message authentication code is used by the first node to verify integrity of the association complete message.

Optionally, the first association establishment message further includes information indicating the group security algorithm of the first communication group. Specifically, the first node may determine the group security algorithm of the first communication group. The group security algorithm is an algorithm supported by nodes in the group, may also be referred to as a group algorithm, and may include one or more of a group encryption algorithm, a group integrity protection algorithm, a group KDF algorithm, or the like.

It should be noted that "decryption" in the foregoing implementation may be an independent step, or may be a description of a function. That is, another piece of information may be obtained by decrypting a piece of information, or another piece of information may be obtained by using a piece of information in a decryption manner.

Further optionally, that the first node determines the group security algorithm of the first communication group includes at least the following cases:

Case 1: The group security algorithm corresponding to the first communication group is preconfigured or defined on the first node. Therefore, the first node may determine the corresponding group security algorithm based on an identifier of the first communication group (for example, a number of the first communication group). For example, the group integrity protection algorithm is used as an example. FIG. 6A and FIG. 6B are a schematic diagram of a method for determining a group security algorithm according to an embodiment of this application. It can be learned that a group algorithm corresponding to an ID of a communication group may be determined based on the ID of the communication group. For example, refer to information in an area 601. It can be learned that a group integrity protection algorithm corresponding to a communication group whose group identify (group identify, GID) is GID2 is a ZUC cryptographic algorithm (ZUC). Optionally, the group security algorithm is an algorithm with a highest priority in algorithms supported by nodes in the first communication group.

Case 2: The first node may determine the group security algorithm based on an algorithm selection policy, where the algorithm selection policy includes at least one of a priority-based algorithm selection policy and a sequence-based algorithm selection policy. Refer to FIG. 6A and FIG. 6B. An example in which a first algorithm selection policy is a priority-based algorithm selection policy is used. Refer to information in an area 602. It can be learned that a node E0 is a node in a communication group whose ID is GID1, and the communication group GID1 includes the node E0, a node E1, and a node E2. The first node may obtain security capability (Sec Capabilities) information of nodes in the group. Refer to information in an area 603. It can be learned that integrity protection algorithms supported by the node E0 are AES-CCM, ZUC, and AES-GCM, integrity protection algorithms supported by the node E1 are AES-CCM and AES-GCM, security algorithms supported by the node E2 are AES-CCM and AES-GCM, and all nodes in the group support AES-CCM and AES-GCM. Refer to an area 604. It can be learned that a priority of the AES-CCM is 1. Refer to an area 605. It can be learned that a priority of the AES-GCM is 3. Therefore, the AES-CCM may be determined as the integrity protection algorithm.

Optionally, in the sequence-based algorithm selection policy, a security algorithm in an earlier sequence may be determined based on a predefined or preset sequence. Further optionally, if priorities of two algorithms supported by the nodes in the communication group are the same, a security algorithm in an earlier sequence may be selected.

Further optionally, the group security algorithm of the first communication group includes a third KDF algorithm. The first node may generate a session key of the first communication group by using the third KDF algorithm based on types of the group key and the session key of the first communication group. The type of the session key may include one or more of a signaling plane encryption key, a signaling plane integrity protection key, a user plane encryption key, a user plane integrity protection key, and the like. For example, the signaling plane encryption key is used as an example. A signaling plane encryption key Kenc is generated based on the group key GK of the first communication group and a key type "enc" of the signaling plane encryption key by using the third KDF, for example, Kenc=third KDF (GK, "enc"). For another example, the third KDF may specifically include a plurality of hash algorithms, and an algorithm identifier may be used to indicate a hash algorithm to be used. Therefore, the generated encryption key Kenc may further meet the following formula: Kenc=third KDF (GK, key type, algorithm identifier). Further, the type of the session key may correspond to a scenario in which the session key is applied. In this application, only the foregoing four types are used as examples. In specific implementation, another type of the session key may be further included.

In the embodiment shown in FIG. 3, after receiving an association request from the second node, the first node may determine the group key of the first communication group to which the second node belongs, then encrypt the group key by using the shared key between the first node and the second node to obtain the first protection key, carry the first protection key in an association establishment message, and send the association establishment message to the second node. It can be learned that, because a protection key carried in the association establishment message is obtained by encrypting the group key by using the shared key, privacy of the group key can be protected regardless of whether the first association establishment message is encrypted. In this way, when performing multicast communication with the first communication group, the first node may encrypt a multicast message by using the group key, to protect the multicast message, prevent a non-group member from obtaining communication content, and improve security of the multicast communication.

Further, the first node may send, in the association establishment message, the group key to the second node by using the protection key, and integrate a group key distribution procedure into a procedure of establishing an association between the first node and the second node. Therefore, no additional key distribution procedure is needed, which saves overheads of network resources and improves efficiency of multicast communication.

Figure 7:
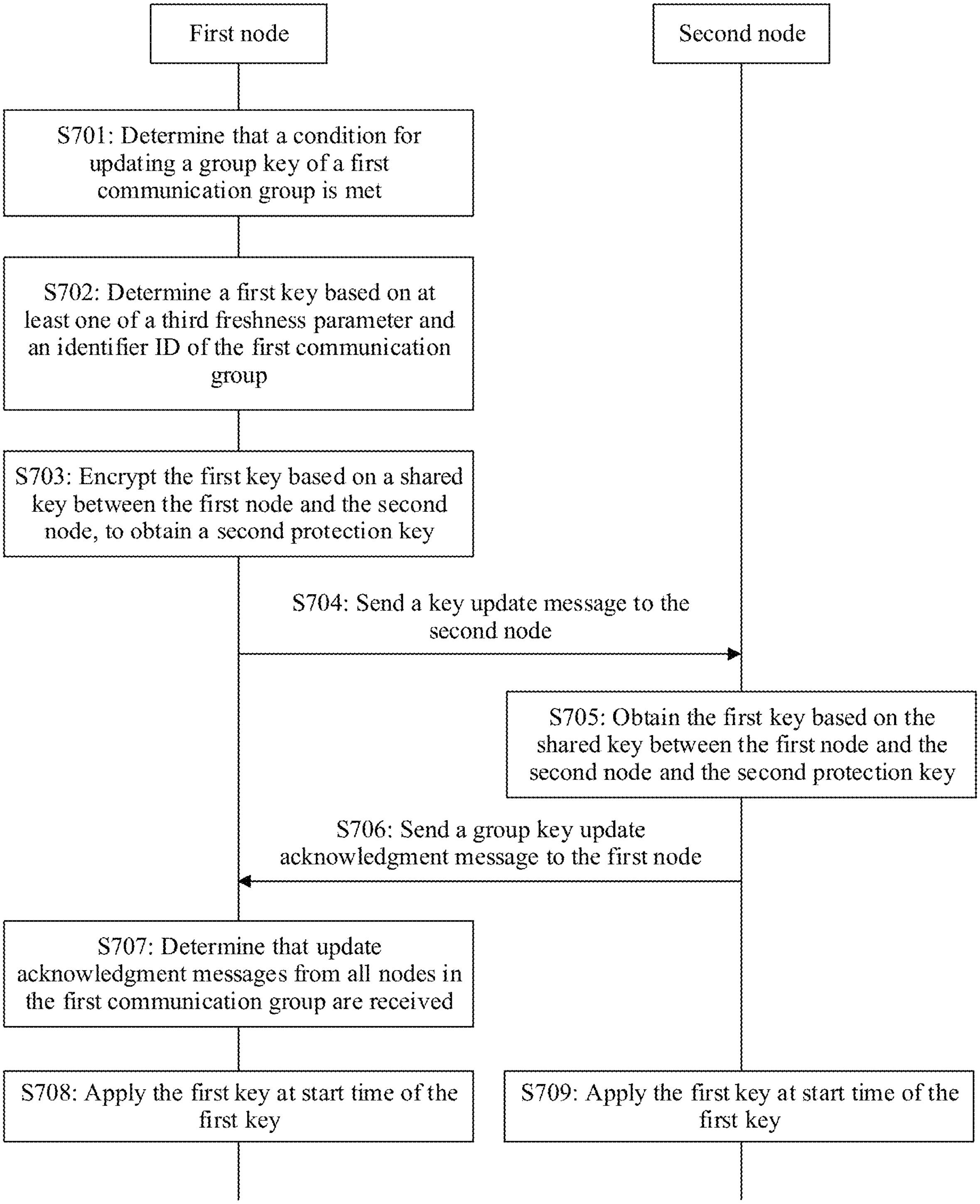
FIG. 7 is a flowchart of another communication method according to an embodiment.

FIG. 7 shows another communication method according to an embodiment of this application. The communication method may be implemented based on the architecture shown in FIG. 1. The method includes at least the following steps.

Step S701: A first node determines that a condition for updating a group key of a first communication group is met.

Specifically, the condition for updating the group key of the first communication group includes at least one of the following conditions:

Condition 1: A difference between a frame number of a current communication frame and a marked frame number is greater than or equal to a first threshold, where the frame number of the current communication frame and the marked frame number are in a same round of counting cycle, and the marked frame number is a frame number on which key update needs to be performed or the marked frame number is a frame number of a communication frame encrypted for the first time by using the group key of the first communication group.

Figure 8A:
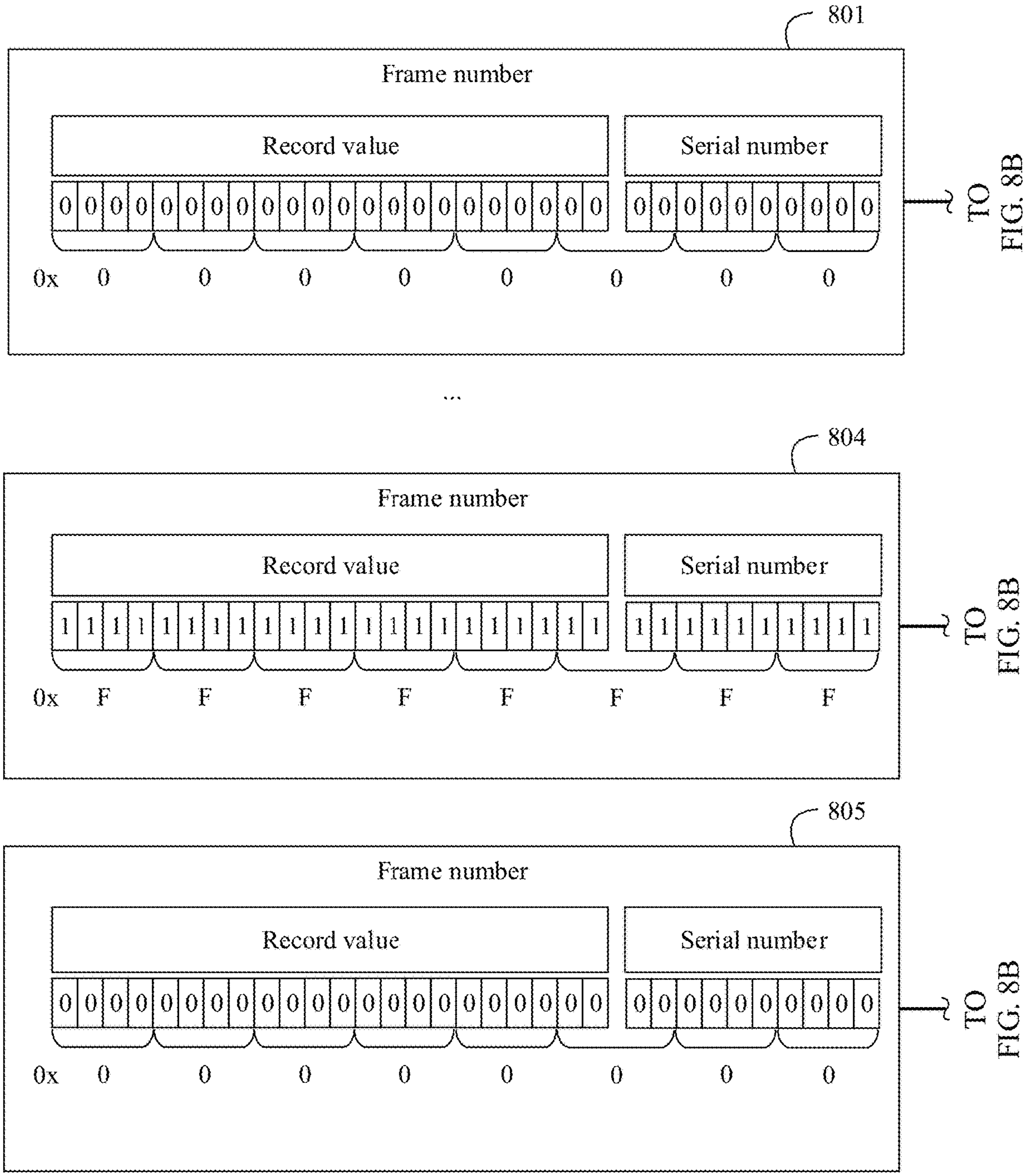
FIG. 8A and FIG. 8B are a schematic diagram of a communication scenario according to an embodiment.
Figure 8B:
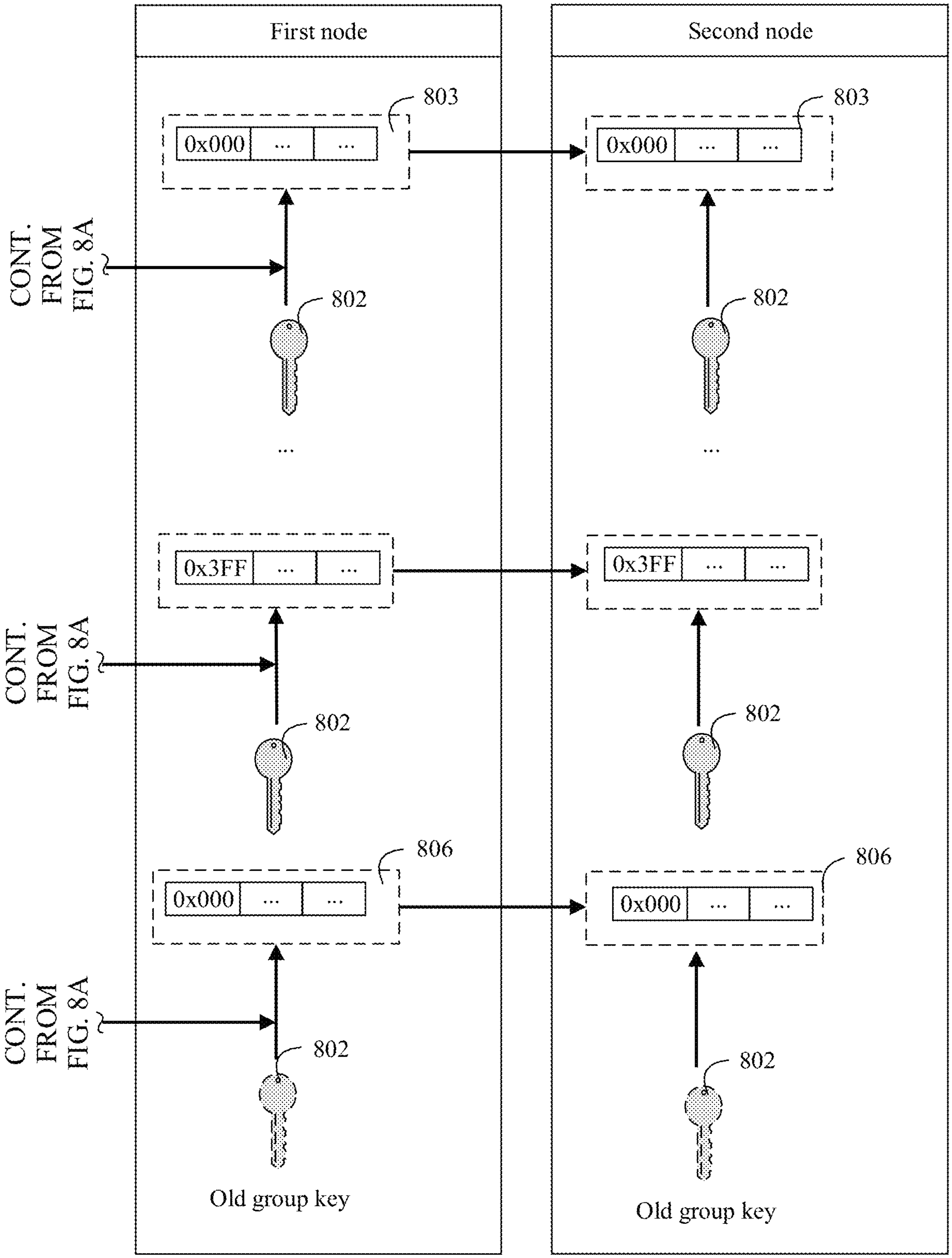

The frame number of the communication frame includes a record value and a serial number of the communication frame. The frame number may be used to encrypt the communication frame in a transmission process of the communication frame. Optionally, the communication frame may be a MAC data frame, and the serial number may be a MAC serial number (MAC SN). FIG. 8A and FIG. 8B are a schematic diagram of a possible communication scenario according to an embodiment of this application. A first node may send a multicast message to a plurality of nodes in a communication group, and the multicast message is sent in a form of a communication frame. For ease of description, the multicast message is sent to a second node is merely used as an example in FIG. 8A and FIG. 8B. The multicast message may be encrypted by using a group key and a frame number. For example, a communication frame 803 sent by the first node may be encrypted by using a frame number 801 and a group key 802. The frame number 801 is a 32-bit number, the frame number 801 includes a record value of high 22 bits and a serial number of low 10 bits, and a sequence value of the low 10 bits corresponds to the serial number of the current communication frame 803. Because a quantity of bits of the frame number is limited, a rollover occurs when the frame number reaches a maximum value. For example, in the communication process shown in FIG. 8A and FIG. 8B, a value of the frame number 801 is 0x00000000. When the communication frames are continuously sent, the frame numbers are accumulated. After a value of a frame number reaches the maximum value (for example, a value of a frame number 804 is 0xFFFFFFFF), a rollover (rollover) occurs, and counting starts from 0 again. For example, the value of the frame number 804 is 0x00000000. However, when the frame number reaches a frame number 0x00000001 again, if the group key 802 is not updated, a same key and a same frame number are used to encrypt two different communication frames (the communication frame 803 and a communication frame 806). As a result, the key is easily cracked, and communication security is threatened. Therefore, the group key needs to be updated before the frame number reaches the frame number encrypted last time by using the group key 802, to avoid affecting privacy of the group key. It should be noted that only an example in which the frame number is 32 bits is used herein. In a specific implementation process, a size of the frame number is preconfigured based on a requirement. This is not limited in this application.

Specifically, the first node may record the marked frame number. For example, the marked frame number may be a frame number on which a key needs to be updated, or the marked frame number may be a frame number of a communication frame encrypted for the first time by using the group key of the first communication group. The first node may update the group key before the frame number is accumulated to the frame number encrypted last time by using the group key, for example, update the group key 10 frames in advance. Further, the first node may further indicate time at which a new key is applied, for example, may indicate that a new group key is applied five frames in advance.

Figure 9A:
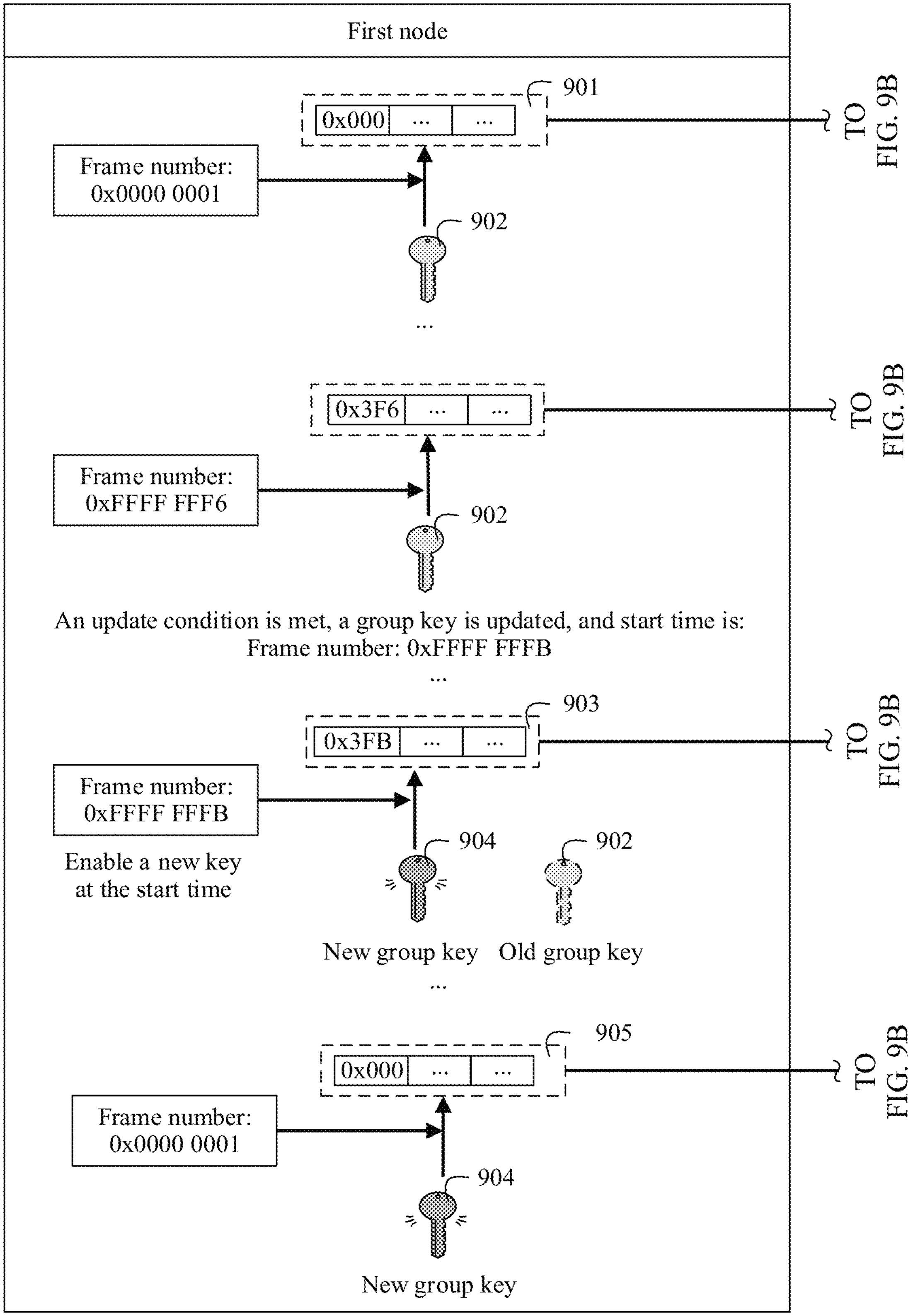
FIG. 9A and FIG. 9B are a schematic diagram of a scenario of updating a group key according to an embodiment.
Figure 9B:
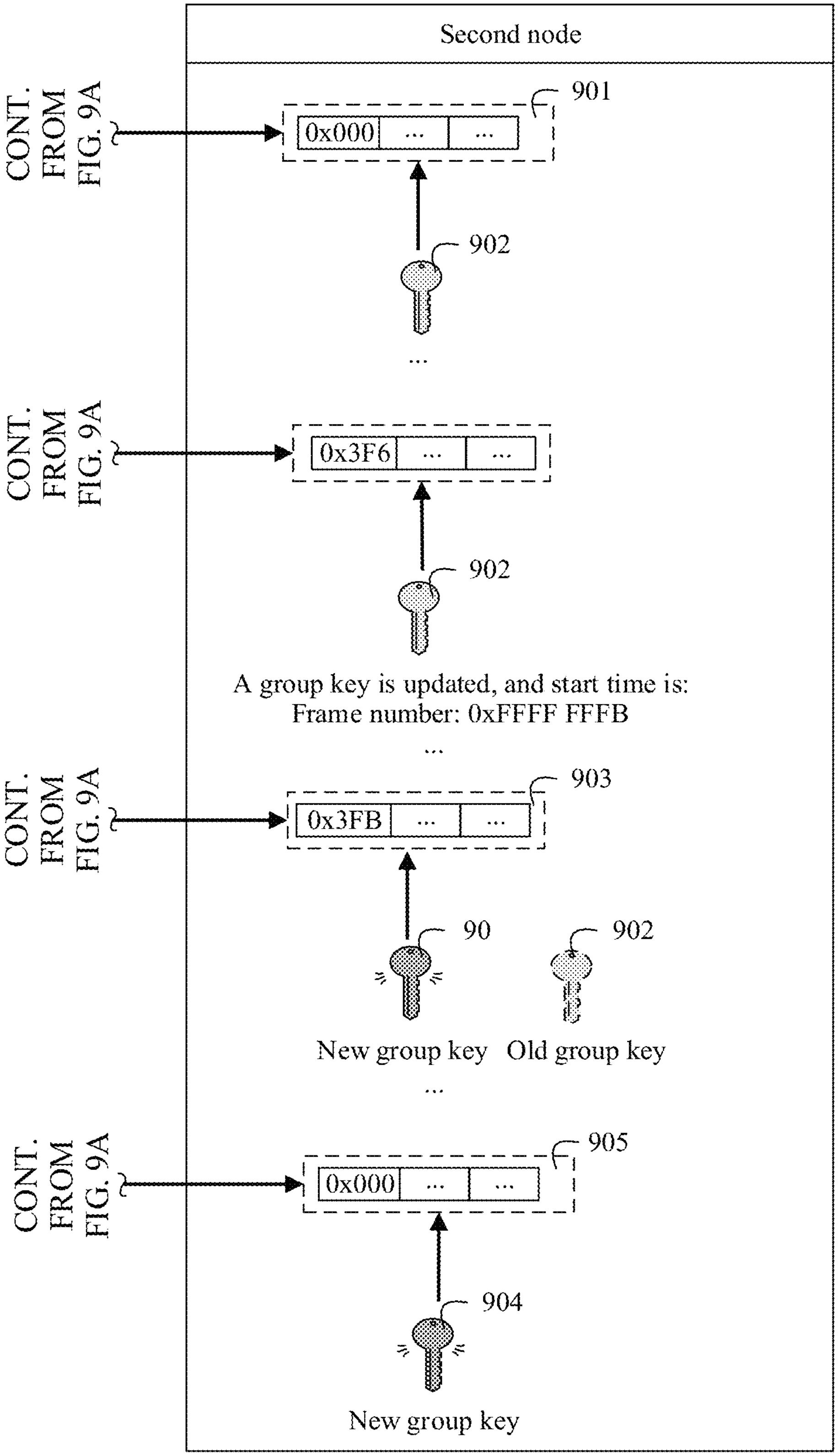

Specifically, if the frame number of the current communication frame and the marked frame number are in a same round of counting cycle, when the difference between the frame number of the current communication frame and the marked frame number is greater than or equal to the first threshold, the group key of the first communication group needs to be updated. For example, the marked frame number is a frame number of a communication frame encrypted for the first time by using the group key of the first communication group. FIG. 9A and FIG. 9B are a schematic diagram of a scenario of updating a group key according to an embodiment of this application. A communication frame 901 is a communication frame encrypted for the first time by using a group key 902, and a frame number of the communication frame is 0x00000001. A first node may mark the frame number (that is, the marked frame number is 0x00000001). If the first node needs to update the group key 10 frames in advance, a first threshold is preset to 0xFFFF FFF5. In other words, if a frame number of a current communication frame reaches 0xFFFF FFF6, a difference between the frame number of the current communication frame and the marked frame number reaches 0xFFFF FFF5. Therefore, the first node may update the group key of the first communication group when the frame number reaches 0xFFFF FFF6. Further optionally, when the group key is updated, time at which the new group key is applied may be indicated. For example, the new group key may be applied five frames in advance of the marked frame number. In this case, when the frame number reaches 0xFFFF FFFB, the first node may encrypt a communication frame 905 by using a new group key 904 and the frame number 0xFFFF FFFB. In this way, when a rollover occurs on the frame number of the communication frame and then the frame number reaches the marked frame number 0x00000001, the key for encrypting the communication frame 905 is the new group key 904, so that communication security is not affected.

It should be noted that a plurality of thresholds in this application may be specified in a protocol, or may be predefined or preset on a node, or may be determined by the node based on a security requirement. For example, the first threshold may be obtained according to a protocol specification, or may be preset on the first node, or may be determined by the first node based on a security requirement.

Condition 2: A difference between the marked frame number and the frame number of the current communication frame is less than or equal to a second threshold, where the frame number of the current communication frame is in a next round of counting cycle of the marked frame number, and the marked frame number is a frame number on which key update needs to be performed or the marked frame number is a frame number of a communication frame encrypted for the first time by using the group key of the first communication group.

Figure 10A:
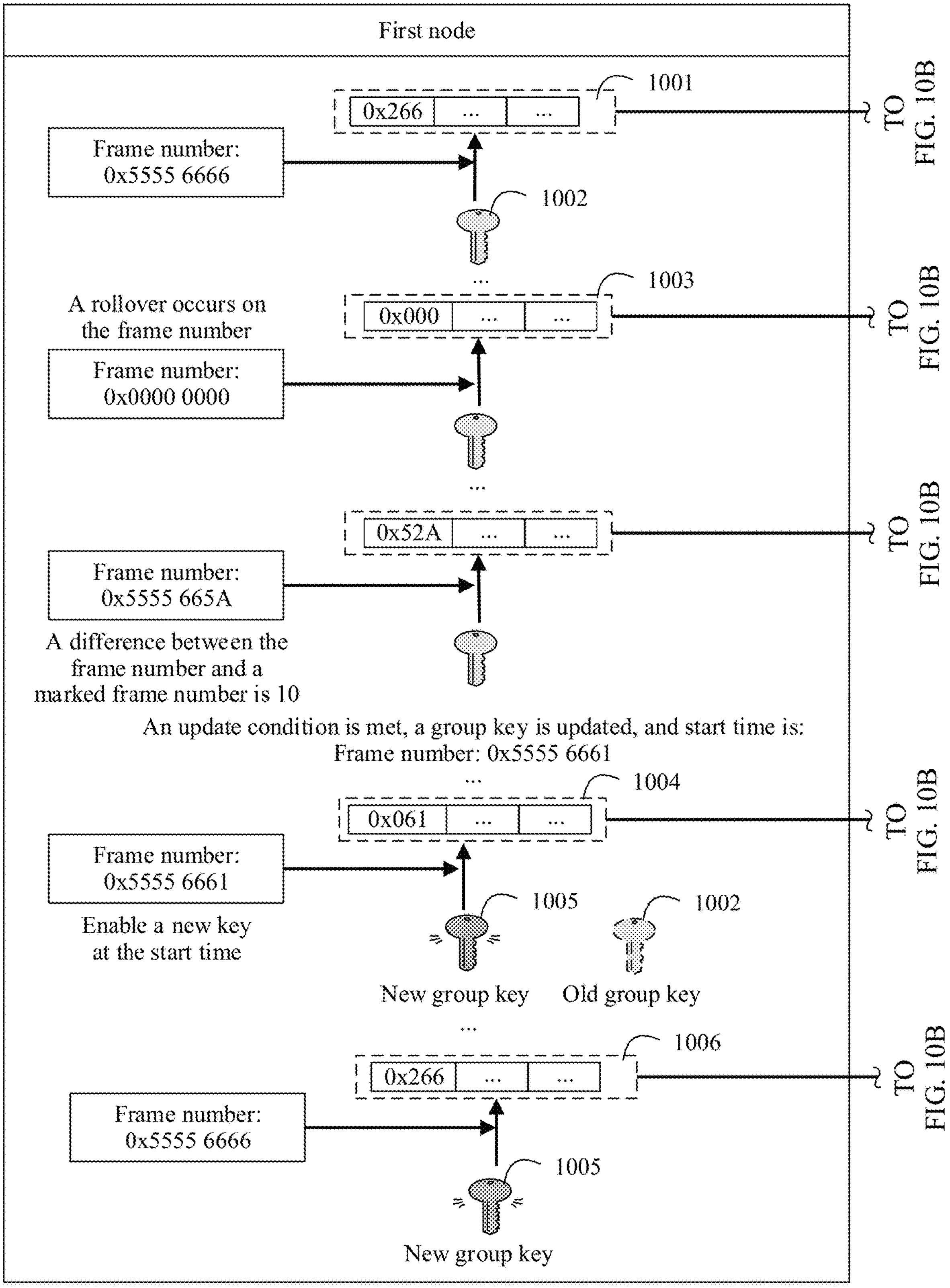
FIG. 10A and FIG. 10B are a schematic diagram of another scenario of updating a group key according to an embodiment.
Figure 10B:
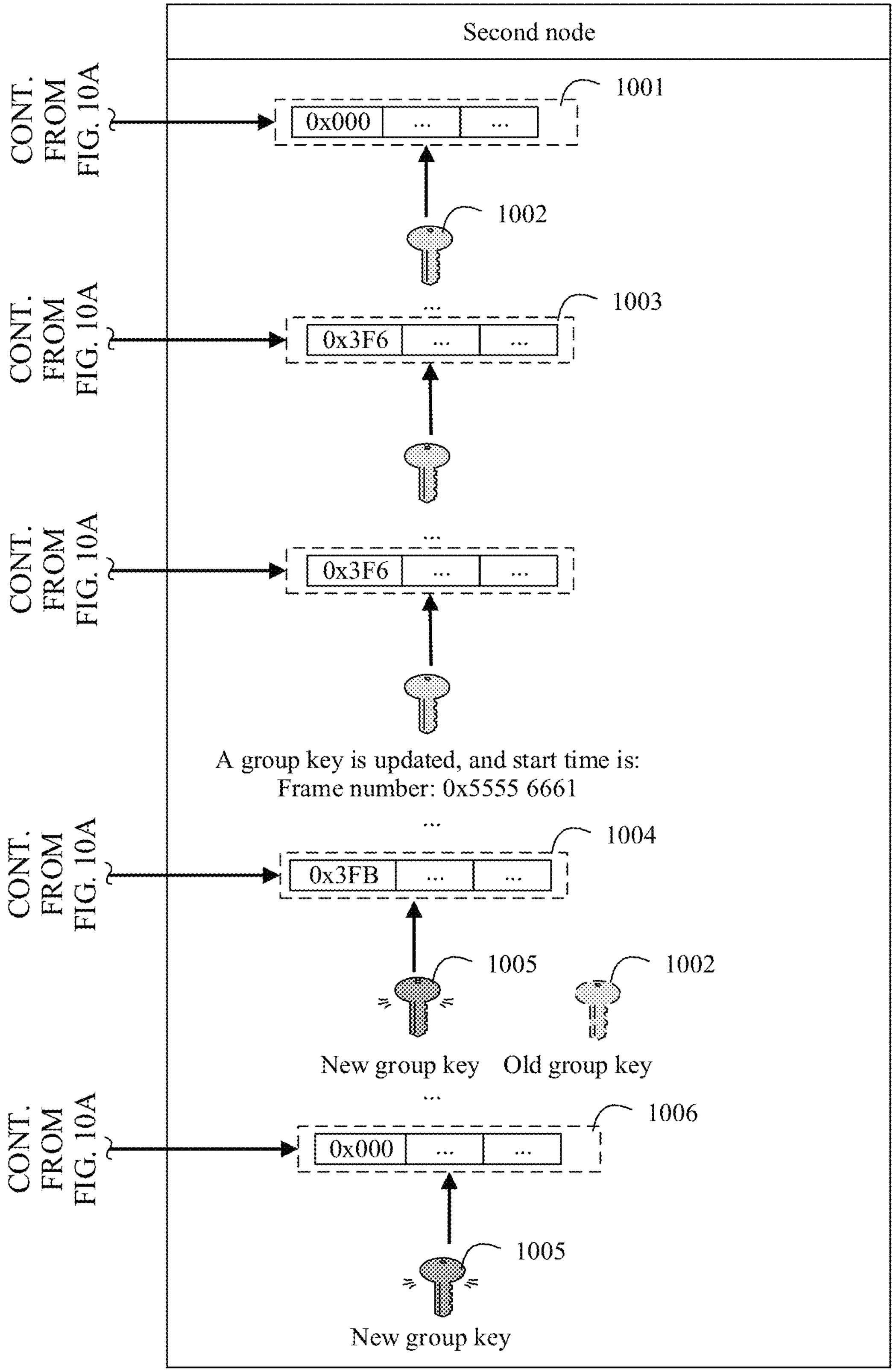

It may be understood that, if the frame number of the current communication frame is in the next round of counting cycle of the marked frame number, the first node needs to update the group key before the marked frame number and the frame number of the current communication frame are less than or equal to the second threshold. For example, the marked frame number is a frame number of a communication frame encrypted for the first time by using the group key of the first communication group. FIG. TOA and FIG. 10B are a schematic diagram of another scenario of updating a group key according to an embodiment of this application. A communication frame 1001 is a communication frame encrypted for the first time by using a group key 1002, and a frame number of the communication frame is 0x5555 6666. A first node may mark the frame number (that is, the marked frame number is 0x5555 6666). If the first node needs to update the group key 10 frames in advance, a second threshold is 10. In other words, if a rollover occurs on a frame number of a current communication frame and the frame number reaches 0x5555 665A, a difference between the marked frame number and the frame number of the current communication frame is 10. Therefore, the first node starts to update the group key of the first communication group when the frame number reaches 0x5555 665A. Further optionally, when the group key is updated, start time of a new group key may be determined. For example, the new group key may be applied five frames in advance of the marked frame number. In this case, when the frame number reaches 0x5555 6661, the first node may encrypt a communication frame 1004 by using a new group key 1005 and the frame number 0x5555 6661. In this way, when the frame number of the communication frame reaches the marked frame number 0x5555 6666, the key for encrypting a communication frame 1006 is the new group key 1005, so that communication security is not affected.

Condition 3: A validity period of the group key of the first communication group expires or use duration of the group key of the first communication group reaches a third threshold.

Optionally, the group key of the first communication group may have a validity period. When the validity period of the group key of the first communication group expires, the group key of the first communication group needs to be updated. For example, the validity period of the group key of the first communication group may be specific time, or the validity period may be a frame number of a communication frame, or the validity period is a counter value, or the like. For example, the validity period of the group key of the first communication group may be 08:08:08 on Jul. 6, 2020, and may indicate that a date and time when the validity period of the group key of the first communication group is valid is 08:08:08 on Jul. 6, 2020 or a date and time when the validity period of the group key of the first communication group is invalid starts after 08:08:08 on Jul. 6, 2020. Therefore, if current time is the validity period, the first node may update the group key. Optionally, the first node may update the group key of the first communication group in advance before the validity period expires, for example, update the group key of the first communication group 10 minutes before the validity period expires.

Optionally, the group key of the first communication group may have use duration. When the use duration of the group key of the first communication group reaches (greater than or equal to) the third threshold, the group key of the first communication group needs to be updated. Further optionally, the third threshold may be specified in a protocol, or predefined or preset on the first node, or the threshold may be determined by the first node based on a security requirement. For example, it is specified in the protocol that the third threshold is 24 hours. When the group key of the first communication group reaches 24 hours, the group key of the first communication group needs to be updated. For another example, on the first node, the third threshold is predefined as 1000 communication frames (which may specifically include 1000 management frames and 1000 data frames). When the 1000 management frames or the 1000 data frames are encrypted by using the group key of the first communication group, the group key of the first communication group needs to be updated.

Condition 4: At least one second node in the first communication group leaves the first communication group.

It may be understood that, if one second node in the communication group leaves (leave) the first communication group, the first node needs to update the group key, so that communication between the first node and the second node in the first communication group is private. For example, a first communication group GID1 includes three second nodes: a second node E0 to a second node E2. Because a function of the second node E2 is aged, the second node E2 sends, to the first node, a request message used to indicate to apply for exiting (exit) the first communication group. After the first node determines that the second node E2 exits the first communication group (for example, after the first node deletes the second node E2 from the nodes included in the communication group GID1 in the communication group information table shown in Table 1), the first node may update the group key of the first communication group. For another example, the first node receives a configuration message sent by an upper-layer management node. The configuration message indicates the first node to remove (remove) the second node E1 from the first communication group. After the first node determines that the second node E1 is removed from the first communication group (for example, after the first node deletes the second node E1 from the nodes included in the communication group GID1 in the communication group information table shown in Table 1), the first node may update the group key of the first communication group.

Further, the first node may be further configured to update the group key when one second node joins the first communication group or one second node leaves the first communication group. For example, a first communication group GID2 includes two second nodes: a second node E3 and a second node E4. After an administrator adds a second node E9 to the first communication group (for example, after the second node E9 is added to the nodes included in the communication group GID2 in the communication group information table shown in Table 1), the first node may update the group key. For another example, the first node receives a configuration message. The configuration message indicates the first node to add a second node E10 to the first communication group GID2. After the first node determines that the second node E9 is added to the first communication group GID2 (for example, after the second node E10 is added to the nodes included in the communication group GID2 in the communication group information table shown in Table 1), the first node may update the group key of the first communication group.

Step S702: The first node determines a first key based on at least one of a third freshness parameter and an identifier ID of the first communication group.

Specifically, that the first node determines a first key based on at least one of a third freshness parameter and an identifier ID of the first communication group includes at least the following two methods:

Method 1: The first node obtains one third freshness parameter, and uses the third freshness parameter as the first key.

Method 2: The first node generates the first key based on at least one of the third freshness parameter and the ID of the first communication group by using a second KDF. The third freshness parameter is a freshness parameter obtained (or generated) by the first node, and there may be one or more third freshness parameters. Optionally, the second KDF may be a KDF algorithm with a highest priority on the first node. The first node may generate the first key in the following specific implementations:

Implementation 1: The first node generates the first key based on the third freshness parameter and the ID of the first communication group by using the second KDF. For example, the third freshness parameter is a freshness parameter NONCEg3, and the ID of the first communication group is a GID. The generated first key NGK meets the following formula: NGK=KDF (NONCEg3, GID).

Implementation 2: The first node generates the first key based on the third freshness parameter by using the second KDF. For example, the third freshness parameter is a freshness parameter NONCEg3 and a freshness parameter NONCEg4. The generated first key NGK meets the following formula: NGK=KDF (NONCEg3, NONCEg4).

Optionally, the first key is used to replace the group key of the first communication group and serves as a new group key of the first communication group.

Step S703: The first node encrypts the first key based on a shared key between the first node and the second node, to obtain a second protection key.

Specifically, that the first node encrypts the first key based on a shared key between the first node and the second node may include at least the following several implementation solutions:

Implementation solution 1: The first node encrypts the first key by using the shared key, to obtain the second protection key.

Implementation solution 2: The first node may encrypt the first key by using the shared key and a fourth freshness parameter, to obtain the second protection key. The fourth freshness parameter is one or more of a number once value, a counter value, a frame number, and the like that are obtained (or generated) by the first node.

Implementation solution 3: The first node generates a second intermediate key based on the shared key, and encrypts the first key by using the second intermediate key, to obtain the second protection key.

Implementation solution 4: The first node generates a second intermediate key based on the shared key and the fourth freshness parameter, and encrypts the first key by using the second intermediate key, to obtain the second protection key. For example, the first node generates a second intermediate key Kg2 based on a shared key Kdh and a value counter1 of a first counter by using a KDF, for example, Kg2=KDF (kdh, counter1). The first counter may be used to represent a quantity of times that the first node generates the second intermediate key Kg based on the shared key Kdh. For another example, the first node generates the second intermediate key Kg2 based on a session key Kenc and a fourth freshness parameter NONCEk2 by using the KDF, for example, Kg2=KDF (Kenc, NONCEk2).

That the first node encrypts the first key by using the second intermediate key may be specifically as follows: The first node performs exclusive-OR processing on the first key and a first intermediate key to obtain a first protection key. For example, a second protection key GKc2 obtained by the first node through encryption may meet the following formula: $GKc2=NGK \oplus Kg2$, where NGK is the first key, $\oplus$ is exclusive-OR processing, and Kg2 is the second intermediate key. Because an original value may be obtained after exclusive-OR processing is performed twice, the first node performs exclusive-OR processing on the second intermediate key and the first key. After receiving the second protection key, the second node may generate the same second intermediate key, and perform exclusive-OR processing on the second intermediate key and the second protection key to obtain the first key.

Optionally, the first node may determine that encryption is not enabled for a signaling plane message between the first node and the second node, and encrypt the first key to obtain the second protection key when encryption is not enabled for the signaling plane message. Optionally, if encryption is enabled for the signaling plane message between the first node and the second node, a key update message includes the first key. Because the key update message belongs to the signaling plane message between the first node and the second node, the first key may be protected by encrypting the signaling plane message.

Step S704: The first node sends the key update message to the second node.

Specifically, the key update message includes the second protection key. It may be understood that the first node sends the key update message to the second node, and correspondingly, the second node receives the key update message from the first node.

Optionally, the key update request message further includes the fourth freshness parameter, and the fourth freshness parameter is used by the second node to decrypt the second protection key to obtain the first key.

Optionally, the key update request is further used to indicate start time of the first key and/or a validity period of the first key. The start time of the first key is used to indicate time at which the first key is applied, and the validity period of the first key is used to indicate a period of use of the first key. Further, when the key update request includes the start time of the first key and the validity period of the first key, the first key is applied within the validity period of the first key starting from the start time of the first key.

Optionally, the key update message may be a multicast message sent by the first node to the second node in the first communication group, or may be a unicast message between the first node and the second node. Optionally, in a case in which the key update message is a multicast message, a shared key used when the first node encrypts the first key is the group key of the first communication group (or a session key of the first communication group derived from the group key). Further optionally, when the key update message is a unicast message, the first node may further send the key update message to another second node in the first communication group.

Optionally, the first node may encrypt the key update message by using an encryption key, and correspondingly, the second node may decrypt the key update message by using a corresponding decryption key, to obtain data content in the key update message. Optionally, the key update message includes message authentication code, and the message authentication code is used by the second node to verify integrity of the key update message.

Step S705: The second node obtains the first key based on the shared key between the first node and the second node and the second protection key. Optionally, the second node may decrypt the second protection key based on the shared key between the first node and the second node, to obtain the group key of the first communication group.

Specifically, corresponding to the manner in which the first node encrypts the first key, that the first node decrypts the second protection key based on the shared key between the first node and the second node may include at least the following several implementation solutions:

Implementation solution 1: The second node decrypts the second protection key by using the shared key, to obtain the first key.

Implementation solution 2: The second node may decrypt the second protection key by using the shared key and the fourth freshness parameter, to obtain the first key.

Implementation solution 3: The second node generates the second intermediate key based on the shared key, and decrypts the second protection key by using the second intermediate key, to obtain the first key.

Implementation solution 4: The second node generates the second intermediate key based on the shared key and the fourth freshness parameter, and decrypts the second protection key by using the second intermediate key, to obtain the first key.

Optionally, that the second node decrypts the second protection key by using the second intermediate key may be specifically as follows: The second node performs exclusive-OR processing on the second protection key and the second intermediate key to obtain the first key. For example, that the second node decrypts the second protection key GKc2 based on the second intermediate key Kg2 to obtain the first key NGK may meet the following formula: $NGK=GKc2\oplus Kg2$.

It should be noted that "decryption" in the foregoing implementation may be an independent step, or may be a description of a function. That is, another piece of information may be obtained by decrypting a piece of information, or another piece of information may be obtained by using a piece of information in a decryption manner.

Optionally, the embodiment shown in FIG. 7 further includes some or all of step S706 to step S709. Step S706 to step S709 are as follows:

Step S706: The second node sends an update acknowledgment message to the first node.

It may be understood that the second node sends the update acknowledgment message to the first node, and correspondingly, the first node receives the update acknowledgment message from the second node.

Optionally, the first communication group includes one or more second nodes. The first node may send the key update message to the one or more second nodes. Correspondingly, the first node may receive an update acknowledgment message from the one or more second nodes.

Optionally, the second node may encrypt the update acknowledgment message by using an encryption key. Correspondingly, the first node may decrypt the update acknowledgment message by using a corresponding decryption key, to obtain data content in the update acknowledgment message. Optionally, the update acknowledgment message includes message authentication code, and the message authentication code is used by the first node to verify integrity of the update acknowledgment message.

Step S707: The first node determines that an update acknowledgment message from the at least one second node in the first communication group is received.

Specifically, when it is determined that the update acknowledgment message from the at least one second node in the first communication group is received, it indicates that the new key can be applied.

Optionally, after the first node receives update acknowledgment messages from all nodes in the first communication group, it indicates that the new key can be applied.

Further optionally, the first node may receive the update acknowledgment message from the at least one node within a preset time period. If the update acknowledgment message from the at least one second node is received within the preset time period, it indicates that the new key can be applied. Optionally, for a node that does not receive the update acknowledgment message from the at least one second node, the first node may reconnect to the at least one second node by using a unicast message. For example, the first communication group includes a second node A and a second node B. The first node sends the key update message to the second node A and the second node B. If the first node receives an update acknowledgment message from the second node A, it indicates that the new key can be applied. For the second node B, the first node may reconnect to the second node B, or may further send an encrypted new key to the second node B.

Step S708: The first node applies the first key at the start time of the first key.

Specifically, the start time of the first key may be predefined or preset, or may be indicated by the first node in the key update message. For example, it is predefined in the first node that the first key is applied to a fifth communication frame after the key update message is sent. For another example, the first node indicates, in the key update message, to apply the new key when a frame number reaches 0xFFFF FFFF6. The first node may use the first key as the new group key of the first communication group at the start time of the first key.

Step S709: The second node applies the first key at the start time of the first key.

Specifically, the start time of the first key may be predefined or preset, or may be indicated by the first node in the key update message. For example, it is predefined in the second node that the first key is applied to a fifth communication frame after the key update message is received. For another example, the first node indicates, in the key update message, to apply the new key when a frame number reaches 0xFFFF FFFF6. The second node may use the first key as the new group key of the first communication group at the start time of the first key.

In the embodiment shown in FIG. 7, after it is determined that the condition for updating the group key is met, the first key may be determined, and after the first key is encrypted by using the shared key, the first key is sent to the second node by using the key update message. It can be learned that, because a protection key carried in the key update message is obtained by encrypting the first key by using the shared key, privacy of the first key can be protected regardless of whether the key update message is encrypted.

Optionally, the method in the embodiment shown in FIG. 7 may be subsequent steps of the method in the embodiment shown in FIG. 3. It may be understood that when determining the key of the first communication group by using the communication method shown in FIG. 3, the first node may update the group key of the first communication group by using the communication method shown in FIG. 7. It may be understood that, in this case, the method for determining the first key in the embodiment shown in FIG. 7 is consistent with the method for determining the key of the first communication group in FIG. 3, and the method for encrypting the first key in the embodiment shown in FIG. 7 is consistent with the method for encrypting the group key in FIG. 3.

The foregoing method embodiment shown in FIG. 3 includes many possible implementation solutions. The following separately illustrates some of the implementation solutions with reference to FIG. 11 and FIG. 12A and FIG. 12B. It should be noted that, for related concepts, operations, or logical relationships that are not explained in FIG. 11 and FIG. 12A and FIG. 12B, refer to corresponding descriptions in the embodiment shown in FIG. 3. Therefore, details are not described again.

Figure 11:
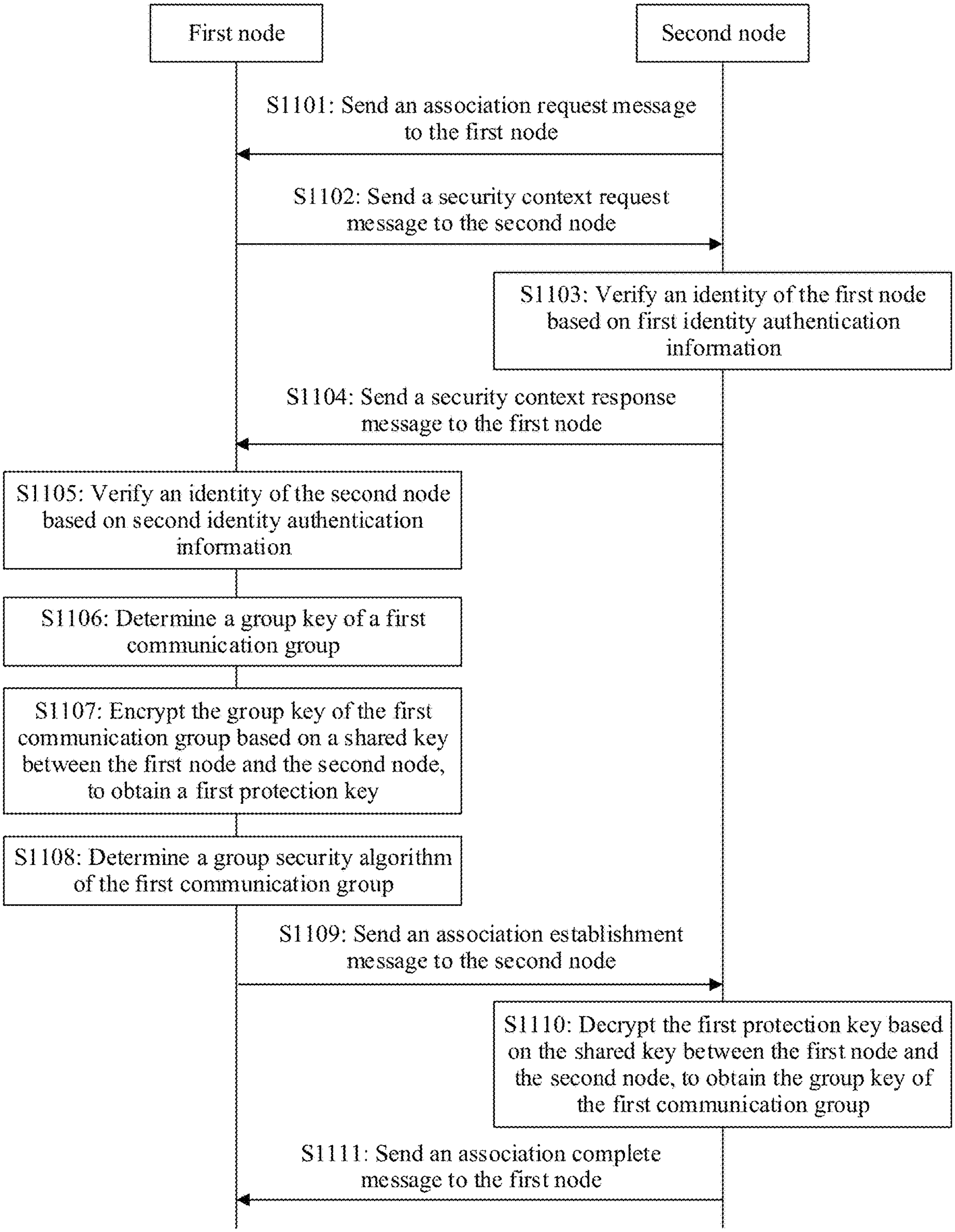
FIG. 11 is a flowchart of still another communication method according to an embodiment.

FIG. 11 is a schematic flowchart of a communication method according to an embodiment of this application. The method may be implemented based on the architecture shown in FIG. 1. The method includes but is not limited to the following steps.

Step S1101: A second node sends an association request message to a first node.

Specifically, the first association request message may include a device identity of the second node (which may be specifically an ID of the second node), information about a security algorithm supported by the second node (or security capabilities (Sec Capabilities) of the second node), and a freshness parameter NONCEe obtained by the second node.

The second node sends a first association request message to the first node, and correspondingly, the first node receives the first association request message from the second node.

For a specific description, refer to content in step S301.

Step S1102: The first node sends a security context request message to the second node.

Specifically, the security context request message includes first identity authentication information AUTHa. Optionally, the security context request message may further include one or more of a freshness parameter NONCEa obtained by the first node, information algorithm1 of a target security algorithm (a unicast security algorithm between the first node and the second node), message authentication code MAC1, and the like.

The first identity authentication information is used by the second node to verify an identity of the first node, and the first identity authentication information is generated by the first node based on a shared key between the first node and the second node. For example, the shared key is a pre-shared key (pre-shared key, PSK) between the first node and the second node. AUTHa generated by the first node by using the PSK meets the following formula: AUTHa=KDF (PSK). Further optionally, parameters participating in KDF generation may further include one or more of the freshness parameter NONCEe obtained by the second node, the freshness parameter NONCEa obtained by the first node, an association request message, and the like. For example, AUTHa=KDF (PSK, NONCEa, association request message). This is not listed one by one herein.

The target security algorithm in the security context request message belongs to a set of security algorithms indicated by information about a security algorithm supported by the second node. Optionally, the target security algorithm includes one or more of an encryption algorithm, an integrity protection algorithm, and a KDF, and the target security algorithm is used to indicate a security algorithm used when the first node communicates with the second node.

The message authentication code MAC1 in the security context request message is used to protect integrity of the security context request message. Optionally, the message authentication code MAC1 may be generated based on a part or all of data in the security context request message and based on an integrity protection key and the integrity protection algorithm.

It may be understood that the first node sends the security context request message to the second node, and correspondingly, the second node receives the security context request message from the first node.

Step S1103: The second node verifies the identity of the first node based on the first identity authentication information.

Specifically, the first identity authentication information is generated by the first node based on the shared key. Therefore, the second node may verify the first identity authentication information by using the shared key, to verify the identity of the first node.

In a possible implementation solution, according to a protocol stipulation, a method used by the first node to generate the first identity authentication information is also used by the second node to generate a check value. If the check value is the same as the first identity authentication information, verification on the identity of the first node succeeds. For example, the second node generates a check value check1 based on a PSK stored in the second node, that is, check1=KDF (PSK), and then compares the check1 with a value of the first identity authentication information AUTHa. If the check1 is the same as the AUTHa, the authentication succeeds.

Optionally, when the security context request message includes the message authentication code MAC1, the second node may further verify integrity of the security context request message based on the message authentication code MAC1.

Optionally, if verification on the identity information of the first node fails or verification on the integrity of the security context request message fails, it indicates that the identity of the first node is untrusted, or it indicates that communication with the first node is insecure. Therefore, the second node may disconnect from the first node, or may not perform a subsequent communication step.

Step S1104: The second node sends a security context response message to the first node.

Specifically, the security context response message includes second identity authentication information AUTHe. Optionally, the security context response message may further include the message authentication code MAC1 and the like.

The second identity authentication information is used by the first node to verify an identity of the second node, and the second identity authentication information is generated by the second node based on the shared key between the first node and the second node. For example, the shared key is the PSK. AUTHe generated by the second node by using the PSK meets the following formula: AUTHe=KDF (PSK). Further optionally, parameters participating in KDF generation may further include one or more of the freshness parameter NONCEe obtained by the second node, the freshness parameter NONCEa obtained by the first node, the security context request message, and the like. For example, AUTHa=KDF (PSK, NONCEe, security context request message). This is not listed one by one herein.

Message authentication code MAC2 in the security context response message is used to protect integrity of the security context response message. Optionally, the message authentication code MAC2 may be generated based on a part or all of data in the security context response message and based on the integrity protection key and the integrity protection algorithm.

It may be understood that the second node sends the security context response message to the first node, and correspondingly, the first node receives the security context response message from the second node. Optionally, the second node may encrypt the security context response message by using an encryption key. Correspondingly, the first node may decrypt the security context response message by using a corresponding decryption key, to obtain data content in the security context response message.

Step S1105: The first node verifies the identity of the second node based on the second identity authentication information.

Specifically, the second identity authentication information is generated by the second node based on the shared key. Therefore, the first node also has the shared key and may verify the second identity authentication information by using the shared key, to verify the identity of the second node.

In a possible implementation solution, according to a protocol stipulation, a method used by the second node to generate the second identity authentication information is also used by the first node to generate a check value. If the check value is the same as the second identity authentication information, verification on the identity of the second node succeeds. For example, the first node generates a check value check2 based on a PSK stored in the first node, that is, check2=KDF (PSK), and then compares the check2 with a value of the second identity authentication information AUTHe. If the check2 is the same as the AUTHe, the authentication succeeds.

Optionally, when the security context response message includes the message authentication code MAC2, the first node may further verify integrity of the security context response message based on the message authentication code MAC2.

Optionally, if verification on the identity information of the second node fails or verification on the integrity of the security context response message fails, it indicates that the identity of the second node is untrusted, or it indicates that communication with the second node is insecure. Therefore, the first node may disconnect from the second node, or may not perform a subsequent communication step.

Step S1106: The first node determines a group key of a first communication group.

Specifically, the first node may determine the group key of the first communication group by using at least the following methods:

Method 1: The first node determines the group key of the first communication group based on an ID of the first communication group, where a correspondence exists between the ID of the first communication group and the group key of the first communication group.

Method 2: The first node obtains a number once NONCEa, and uses NONCEa as the group key of the first communication group.

Method 3: The first node generates the group key of the first communication group based on at least one of a first freshness parameter and the ID of the first communication group by using a second KDF. For example, the first freshness parameter is a freshness parameter NONCEg and the ID of the first communication group is a GID. The generated group key of the first communication group meets the following formula: GK=KDF (NONCEg, GID). For another example, the first freshness parameter is a freshness parameter NONCEg1 and a freshness parameter NONCEg2, and the ID of the first communication group is a GID. The generated group key of the first communication group meets the following formula: GK=KDF (NONCEg1, NONCEg2). For another example, the generated group key of the first communication group meets the following formula: GK=KDF (GID). Optionally, parameters participating in GK generation may further include other information, for example, one or more of a length of a generated key, an identifier of a used hash algorithm, and the like.

For a specific description, refer to content in step S302.

Step S1107: The first node encrypts the group key of the first communication group based on the shared key between the first node and the second node, to obtain a first protection key.

Specifically, at least the following several implementation solutions may be included:

Implementation solution 1: The first node encrypts the group key by using the shared key, to obtain the first protection key.

Implementation solution 2: The first node may encrypt the group key by using the shared key and a second freshness parameter, to obtain the first protection key.

Implementation solution 3: The first node generates a first intermediate key based on the shared key, and encrypts the group key by using the first intermediate key, to obtain the first protection key.

Implementation solution 4: The first node generates the first intermediate key based on the shared key and the second freshness parameter, and encrypts the group key by using the first intermediate key, to obtain the first protection key.

For example, the first node generates a first intermediate key Kg based on a shared key Kdh and a value counter1 of a first counter by using a first KDF, for example, Kg=first KDF (kdh, counter1). The first counter may be used to represent a quantity of times that the first node generates the first intermediate key Kg based on the shared key Kdh. For another example, the first node generates the first intermediate key Kg based on the session key Kenc and the second freshness parameter NONCEk by using the first KDF, for example, Kg=first KDF (Kenc, NONCEk). For another example, the first node generates the first intermediate key Kg based on the shared key Kgt and the number once NONCK (or the counter value counter) by using the first KDF, for example, Kg=first KDF (Kenc, NONCEk (or counter)).

Optionally, that the first node encrypts the group key of the first communication group by using the first intermediate key may be specifically as follows: The first node performs exclusive-OR processing on the group key of the first communication group and the first intermediate key to obtain the first protection key. For example, a first protection key GKc obtained by the first node through encryption may meet the following formula: $GKc=GK \oplus Kg$, where GK is the group key of the first communication group, $\oplus$ is exclusive-OR processing, and Kg is the first intermediate key.

For a specific description, refer to content in step S303.

Optionally, the communication method shown in FIG. 11 may further include step S1108. Step S1108 is specifically as follows:

Step S1108: The first node determines a group security algorithm.

Specifically, the group security algorithm is an algorithm supported by all nodes in the group. Optionally, that the first node determines the group security algorithm of the first communication group includes at least the following cases:

Case 1: The group security algorithm corresponding to the first communication group exists on the first node. Therefore, the first node may determine the corresponding group security algorithm based on an identifier of the first communication group (for example, a number of the first communication group). For example, the group integrity protection algorithm is used as an example. FIG. 6A and FIG. 6B are a schematic diagram of a method for determining a group security algorithm according to an embodiment of this application. It can be learned that a group algorithm corresponding to an ID of a communication group may be determined based on the ID of the communication group. For example, refer to information in an area 601. It can be learned that a group integrity protection algorithm corresponding to a communication group whose group identify (group identify, GID) is GID2 is a ZUC cryptographic algorithm (ZUC).

Case 2: The first node may determine the group security algorithm based on an algorithm selection policy, where the algorithm selection policy includes at least one of a priority-based algorithm selection policy and a sequence-based algorithm selection policy.

Refer to FIG. 6A and FIG. 6B. An example in which a first algorithm selection policy is a priority-based algorithm selection policy is used. For example, refer to information in an area 602. It can be learned that a node E0 is a node in a communication group whose ID is GID1, and the communication group GID1 includes the node E0, anode E1, and anode E2. The first node may obtain security capability (Sec Capabilities) information of nodes in the group. Refer to information in an area 603. It can be learned that integrity protection algorithms supported by the node E0 are AES-CCM, ZUC, and AES-GCM, integrity protection algorithms supported by the node E1 are AES-CCM and AES-GCM, security algorithms supported by the node E2 are AES-CCM and AES-GCM, and algorithms supported by all nodes in the group are AES-CCM and AES-GCM. Refer to an area 604. It can be learned that a priority of the AES-CCM is 1. Refer to an area 605. It can be learned that a priority of the AES-GCM is 3. Therefore, the AES-CCM may be determined as the integrity protection algorithm.

Optionally, in the sequence-based algorithm selection policy, a security algorithm in an earlier sequence may be determined based on a predefined or preset sequence. Further, if priorities of two algorithms supported by the nodes in the communication group are the same, a security algorithm in an earlier sequence may be selected.

Optionally, the group security algorithm includes a third KDF algorithm. The first node may generate a session key of the first communication group by using the third KDF algorithm based on types of the group key and the session key of the first communication group. The type of the session key may include one or more of a signaling plane encryption key, a signaling plane integrity protection key, a user plane encryption key, a user plane integrity protection key, and the like. For example, the signaling plane encryption key is used as an example. A signaling plane encryption key Kenc is generated based on the group key GK of the first communication group and a key type "enc" of the signaling plane encryption key by using the third KDF, for example, Kenc=third KDF (GK, "enc"). Further, the type of the session key may correspond to a scenario in which the session key is applied. In this application, only the foregoing four types are used as examples. In specific implementation, another type of the session key may be further included.

Step S1109: The first node sends an association establishment message to the second node.

Optionally, a first association establishment message includes the first protection key GKc and a group security algorithm Galgorithm of the first communication group.

Optionally, the first association establishment message may further include one or more of the second freshness parameter NONCEk, a validity period GK expiration of the group key of the first communication group, start time timer of the group key of the first communication group, message authentication code MAC3, and the like. The second freshness parameter may be used by the second node to decrypt the first protection key. The validity period of the group key of the first communication group is used to indicate a use period of the group key of the first communication group. The start time of the group key of the first communication group is used to indicate an occasion for applying the group key of the first communication group.

The message authentication code MAC3 in the association establishment message is used by the second node to verify integrity of the association establishment message.

It may be understood that the first node sends the first association establishment message to the second node, and correspondingly, the second node receives the first association establishment message from the first node. Optionally, the first node may encrypt the first association establishment message by using an encryption key. Correspondingly, the second node may decrypt the first association establishment message by using a corresponding decryption key, to obtain data content in the first association establishment message.

Step S1110: The second node decrypts the first protection key based on the shared key between the first node and the second node, to obtain the group key of the first communication group.

For a specific description, refer to content in step S305.

Optionally, the communication method shown in FIG. 11 may further include step S1111. Step S1111 is specifically as follows:

Step S1111: The second node sends an association complete message to the first node.

Specifically, the association complete message is used to indicate that an association is successfully established for the first node. It may be understood that the second node sends the association complete message to the first node, and correspondingly, the first node may receive the association complete message from the second node. Optionally, the first node may encrypt the first association establishment message by using an encryption key. Correspondingly, the second node may decrypt the first association establishment message by using a corresponding decryption key, to obtain data content in the first association establishment message. Optionally, the association complete message includes message authentication code MAC4, and the message authentication code MAC4 is used by the first node to verify integrity of the association complete message.

Figure 12A:
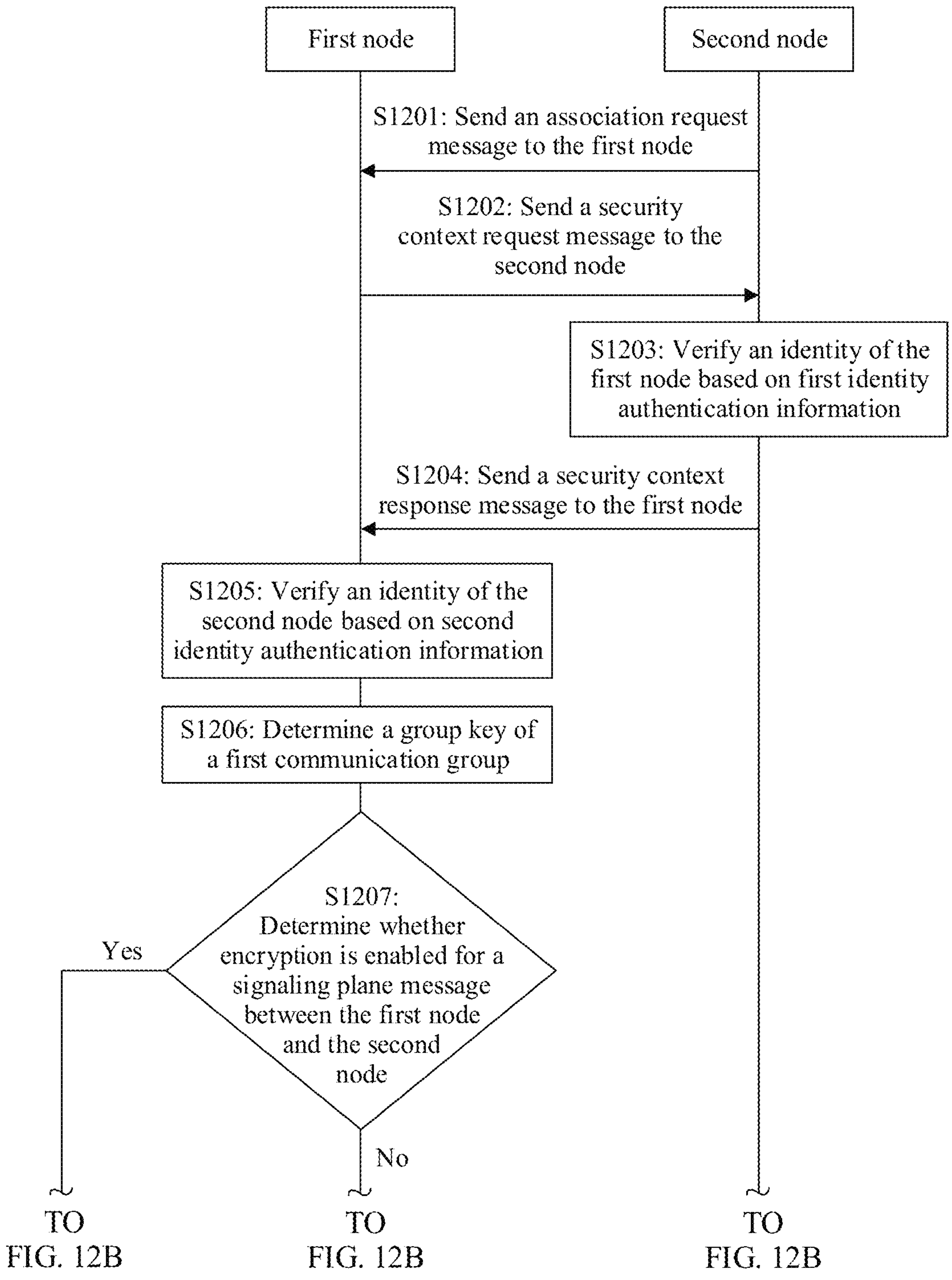
FIG. 12A and FIG. 12B are a flowchart of yet another communication method according to an embodiment.
Figure 12B:
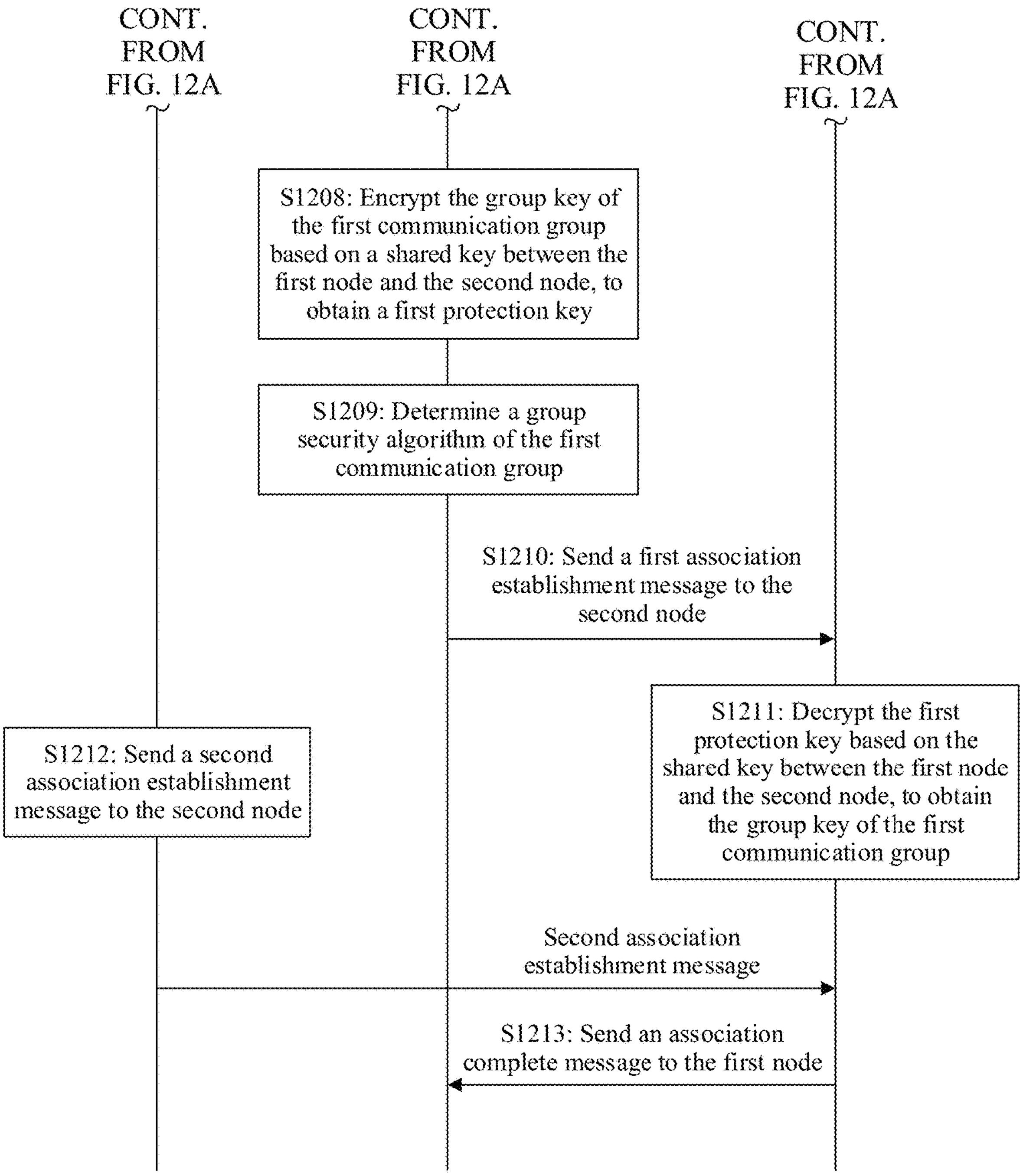

FIG. 12A and FIG. 12B are a schematic flowchart of a communication method according to an embodiment of this application. The method may be implemented based on the architecture shown in FIG. 1. The method includes but is not limited to the following steps.

Step S1201: A second node sends an association request message to a first node.

For a specific description, refer to content in step S1101.

Step S1202: The first node sends a security context request message to the second node.

For a specific description, refer to content in step S1102.

Step S1203: The second node verifies an identity of the first node based on first identity authentication information.

For a specific description, refer to content in step S1103.

Step S1204: The second node sends a security context response message to the first node.

For a specific description, refer to content in step S1104.

Step S1205: The first node verifies an identity of the second node based on second identity authentication information.

For a specific description, refer to content in step S1105.

Step S1206: The first node determines a group key of a first communication group.

For a specific description, refer to content in step S1106.

Step S1207: The first node determines whether encryption is enabled for a signaling plane message between the first node and the second node.

Specifically, if the first node determines that encryption is not enabled for the signaling plane message between the first node and the second node, the first node may perform step S1208 or steps after step S1208.

If the first node determines that encryption is enabled for a signaling plane message between the first node and the second node, the first node may perform step S1212 or a step after step S1212.

Step S1208: The first node encrypts the group key of the first communication group based on a shared key between the first node and the second node, to obtain a first protection key.

For a specific description, refer to content in step S1107.

Step S1209: The first node determines a group security algorithm.

For a specific description, refer to content in step S1108.

Step S1210: The first node sends a first association establishment message to the second node.

For a specific description, refer to content in step S1109.

Step S1211: The second node decrypts the first protection key based on the shared key between the first node and the second node, to obtain the group key of the first communication group.

For a specific description, refer to content in step S1110.

Step S1212: The first node sends a second association establishment message to the second node.

Specifically, if encryption is enabled for the signaling plane message between the first node and the second node, the first node sends the second association establishment message to the second node. The second association establishment message includes the group key of the first communication group. Because the second association establishment message belongs to the signaling plane message between the first node and the second node, the group key may be protected by encrypting the signaling plane message.

Step S1213: The second node sends an association complete message to the first node.

Specifically, the association complete message is used to indicate that an association is successfully established for the first node. It may be understood that the second node sends the association complete message to the first node, and correspondingly, the first node may receive the association complete message from the second node. Optionally, the first node may encrypt the first association establishment message by using an encryption key. Correspondingly, the second node may decrypt the first association establishment message by using a corresponding decryption key, to obtain data content in the first association establishment message. Optionally, the association complete message includes message authentication code, and the message authentication code is used by the first node to verify integrity of the association complete message.

The methods in embodiments of this application are described above in detail, and apparatuses in embodiments of this application are provided below.

Figure 13:
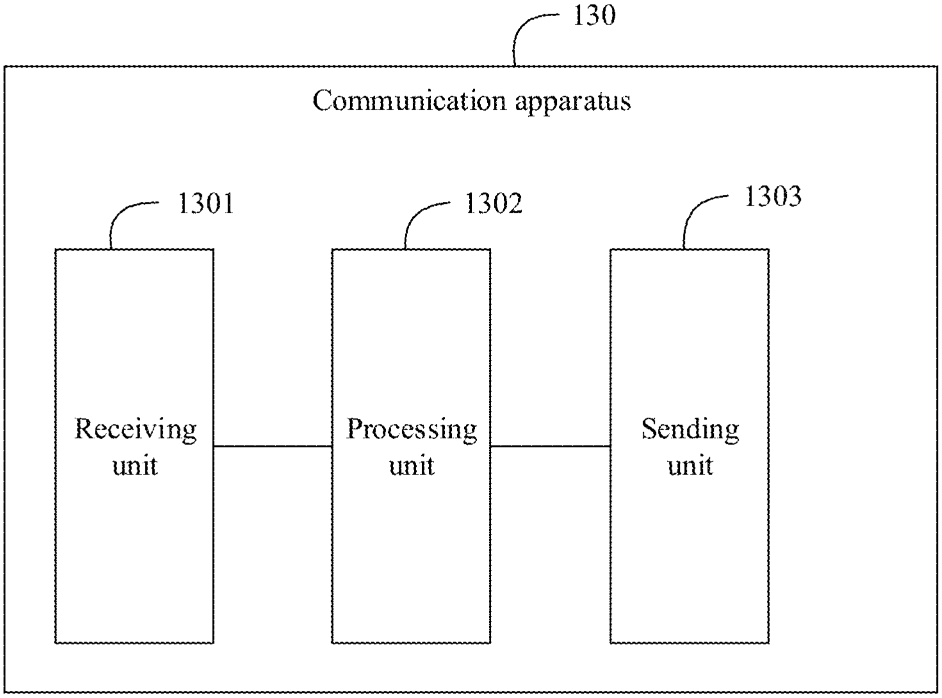
FIG. 13 is a schematic diagram of a structure of a communication apparatus according to an embodiment.

FIG. 13 is a schematic diagram of a structure of a communication apparatus 130 according to an embodiment of this application. The apparatus 130 may be a node, or may be a component in a node, for example, a chip or an integrated circuit. The apparatus 130 may include a receiving unit 1301, a processing unit 1302, and a sending unit 1303. The units are described as follows:

The receiving unit 1301 is configured to receive an association request message from a second node.

The processing unit 1302 is configured to determine a group key of a first communication group. The first communication group is a communication group to which the second node belongs, and the group key of the first communication group is determined based on at least one of a first freshness parameter and an identifier ID of the first communication group.

The processing unit 1302 is configured to encrypt the group key of the first communication group based on a shared key between a first node and the second node, to obtain a first protection key.

The sending unit 1303 is configured to send a first association establishment message to the second node. The first association establishment message includes the first protection key.

In still another possible implementation method, the processing unit 1302 is specifically configured to:

encrypt the group key of the first communication group based on the shared key between the first node and the second node and a second freshness parameter, to obtain the first protection key.

In still another possible implementation method, the processing unit 1302 is specifically configured to:

generate a first intermediate key based on the shared key between the first node and the second node and a second freshness parameter by using a first key derivation function KDF, where the first KDF is a KDF supported by the second node; and perform exclusive-OR processing on the first intermediate key and the group key of the first communication group, to obtain the first protection key.

In still another possible implementation method, the shared key is an encryption key between the first node and the second node, the second freshness parameter is a number once, and the first association establishment message includes the second freshness parameter.

In still another possible implementation method, the second freshness parameter is a value of a first counter, and the first counter is used to represent a quantity of times for encrypting the group key of the first communication group based on the shared key.

In still another possible implementation method, the processing unit 1302 is specifically configured to:

determine the group key of the first communication group based on the ID of the first communication group, where a correspondence exists between the ID of the first communication group and the group key of the first communication group; or generate the group key of the first communication group based on at least one of the first freshness parameter and the ID of the first communication group by using a second KDF.

In still another possible implementation method, the processing unit 1302 is further configured to:

determine a group security algorithm, where the group security algorithm is an algorithm supported by nodes in the first communication group, and the group security algorithm includes at least one of a group encryption algorithm, a group integrity protection algorithm, and a group KDF algorithm.

The first association establishment message further includes information used to indicate the group security algorithm.

In still another possible implementation method, the group security algorithm is an algorithm with a highest priority in algorithms supported by nodes in the first communication group.

In still another possible implementation method, the processing unit 1302 is specifically configured to: determine the group security algorithm based on an algorithm selection policy. The algorithm selection policy includes at least one of a priority-based algorithm selection policy and a sequence-based algorithm selection policy.

In still another possible implementation method, the group security algorithm includes a third KDF algorithm, and the processing unit is further configured to:

generate a session key of the first communication group by using the third KDF algorithm based on types of the group key and the session key of the first communication group.

In still another possible implementation method, the key type includes one or more of a signaling plane encryption key, a user plane encryption key, a signaling plane integrity protection key, or a user plane integrity protection key; or the type of the session key corresponds to a scenario in which the session key is applied.

In still another possible implementation method, the processing unit 1302 is further configured to:

confirm that encryption is not enabled for a signaling plane message between the first node and the second node.

In still another possible implementation method, encryption is enabled for the signaling plane message between the first node and the second node, and the sending unit 1303 is further configured to:

send a second association establishment message to the second node, where the second association establishment message includes the group key of the first communication group, and the second association establishment message belongs to the signaling plane message between the first node and the second node.

In still another possible implementation method, the processing unit 1302 is further configured to determine that a condition for updating the group key of the first communication group is met.

The processing unit 1302 is further configured to determine a first key based on at least one of a third freshness parameter and the identifier ID of the first communication group.

The processing unit 1302 is further configured to encrypt the first key based on the shared key between the first node and the second node, to obtain a second protection key.

The sending unit 1303 is further configured to send a key update message to the second node. The key update message includes the second protection key.

In still another possible implementation method, the first key is used to replace the group key of the first communication group.

In still another possible implementation method, the key update message is further used to indicate start time of the first key and a validity period of the first key, and the first key is applied within the validity period of the first key starting from the start time of the first key.

In still another possible implementation method, the processing unit 1302 is further configured to:

determine that an update acknowledgment message from at least one second node that belongs to the first communication group is received; and apply the first key at the start time of the first key.

In still another possible implementation method, the processing unit 1302 is specifically configured to:

determine that update acknowledgment messages from all second nodes that belong to the first communication group are received.

In still another possible implementation method, the processing unit 1302 is specifically configured to:

encrypt the key based on the shared key between the first node and the second node and a fourth freshness parameter, to obtain the second protection key.

In still another possible implementation method, the condition for updating includes:

a difference between a frame number of a current communication frame and a marked frame number is greater than or equal to a first threshold, where the frame number of the current communication frame and the marked frame number are in a same round of counting cycle, and the marked frame number is a frame number on which key update needs to be performed or the marked frame number is a frame number of a communication frame encrypted for the first time by using the group key of the first communication group;

a difference between the marked frame number and the frame number of the current communication frame is less than or equal to a second threshold, where the frame number of the current communication frame is in a next round of counting cycle of the marked frame number, and the marked frame number is a frame number on which key update needs to be performed or the marked frame number is a frame number of a communication frame encrypted for the first time by using the group key of the first communication group;

a validity period of the group key of the first communication group expires or use duration of the group key of the first communication group reaches a third threshold; or the at least one second node in the first communication group leaves the first communication group.

It should be noted that for implementation of each unit, refer to corresponding descriptions in the embodiment shown in FIG. 3, FIG. 7, FIG. 11, or FIG. 12A and FIG. 12B. The apparatus 130 may be the first node in the embodiment shown in FIG. 3, FIG. 7, FIG. 11, or FIG. 12A and FIG. 12B.

It may be understood that, in the apparatus embodiments of this application, division into a plurality of units is merely logical division based on functions, and is not intended to limit a specific structure of the apparatus. In specific implementation, some functional modules may be further divided into more fine functional modules, and some functional modules may be combined into one functional module. However, regardless of whether the functional modules are further divided or combined, general procedures performed by the apparatus in a communication process are the same. For example, the receiving unit 1301 and the sending unit 1303 in the apparatus 130 may also be combined into a communication unit. Usually, each unit corresponds to respective program code (or program instructions). When the program code corresponding to the unit is run on a processor, the unit executes a corresponding procedure to implement a corresponding function.

Figure 14:
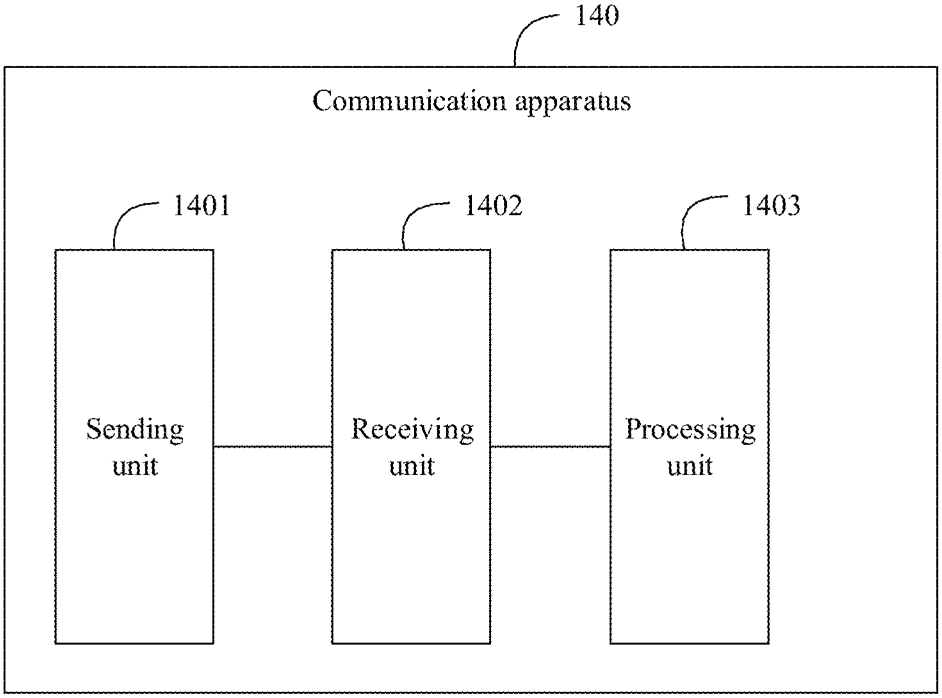
FIG. 14 is a schematic diagram of a structure of another communication apparatus according to an embodiment.

FIG. 14 is a schematic diagram of a structure of a communication apparatus 140 according to an embodiment of this application. The apparatus 140 may be a node, or may be a component in a node, for example, a chip or an integrated circuit. The apparatus 140 may include a sending unit 1401, a receiving unit 1402, and a processing unit 1403. The units are described as follows:

The sending unit 1401 is configured to send an association request message to a first node.

The receiving unit 1402 is configured to receive a first association establishment message from the first node. The first association establishment message includes a first protection key.

The processing unit 1403 is configured to obtain a group key of a first communication group based on a shared key between the first node and a second node and the first protection key. The first communication group is a communication group to which the second node belongs.

In still another possible implementation method, the first node and the second node share the shared key.

In still another possible implementation method, the processing unit 1403 is specifically configured to:

obtain the group key of the first communication group based on the shared key between the first node and the second node, a second freshness parameter, and the first protection key.

In still another possible implementation method, the processing unit 1403 is specifically configured to:

generate a first intermediate key based on the shared key between the first node and the second node and a second freshness parameter by using a first key derivation function KDF; and obtain the group key of the first communication group based on the first intermediate key and the first protection key.

In still another possible implementation method, the shared key is an encryption key between the first node and the second node, the second freshness parameter is a number once, and the first association establishment message includes the second freshness parameter.

In still another possible implementation method, the second freshness parameter is a value of a first counter, and the first counter is used to represent a quantity of times for encrypting the group key of the first communication group based on the shared key.

In still another possible implementation method, the first association establishment message further includes information used to indicate a group security algorithm, the group security algorithm is an algorithm supported by nodes in the first communication group, and the group security algorithm includes at least one of a group encryption algorithm, a group integrity protection algorithm, and a group KDF algorithm.

In still another possible implementation method, the group security algorithm is an algorithm with a highest priority in algorithms supported by nodes in the first communication group.

Alternatively, the determining a group security algorithm corresponds to an algorithm selection policy. The algorithm selection policy includes at least one of a priority-based algorithm selection policy and a sequence-based algorithm selection policy.

In still another possible implementation method, the processing unit 1403 is further configured to:

generate a session key of the first communication group by using the third KDF algorithm based on types of the group key and the session key of the first communication group.

In still another possible implementation method, the key type includes one or more of a signaling plane encryption key, a user plane encryption key, a signaling plane integrity protection key, or a user plane integrity protection key; or the type of the session key corresponds to a scenario in which the session key is applied.

In still another possible implementation method, before the encrypting the first protection key based on the shared key between the first node and the second node, to obtain the group key of the first communication group, further including:

confirming that encryption is not enabled for a signaling plane message between the first node and the second node.

In still another possible implementation method, the receiving unit 1402 is further configured to receive a second association establishment message from the first node. The second association establishment message includes the group key of the first communication group, and the second association establishment message belongs to the signaling plane message between the first node and the second node.

The processing unit 1403 is further configured to decrypt the second association establishment message by using a signaling plane encryption key between the first node and the second node, to obtain the group key of the first communication group.

In still another possible implementation method, the receiving unit 1402 is further configured to receive a key update message from the first node. The key update message includes a second protection key.

The processing unit 1403 is further configured to obtain a first key based on the shared key between the first node and the second node and the second protection key.

In still another possible implementation method, the first key is used to replace the group key of the first communication group.

In still another possible implementation method, the key update message is further used to indicate start time of the first key and a validity period of the first key, and the first key is applied within the validity period of the first key starting from the start time of the first key.

In still another possible implementation method, the processing unit 1403 is further configured to:

send an update acknowledgment message to the first node; and apply the first key at the start time of the first key.

In still another possible implementation, the processing unit 1403 is specifically configured to:

obtain the first key based on the shared key between the first node and the second node, a fourth freshness parameter, and the second protection key.

It should be noted that for implementation of each unit, refer to corresponding descriptions in the embodiment shown in FIG. 3, FIG. 7, FIG. 11, or FIG. 12A and FIG. 12B. The apparatus 140 may be the second node in the embodiment shown in FIG. 3, FIG. 7, FIG. 11, or FIG. 12A and FIG. 12B.

Figure 15:
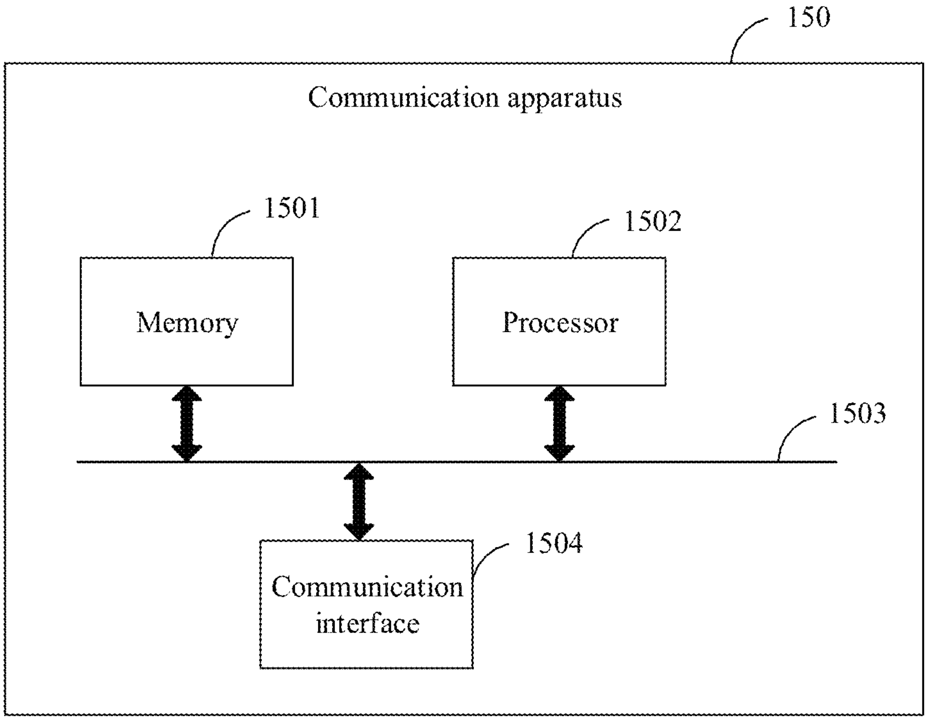
FIG. 15 is a schematic diagram of a structure of still another communication apparatus according to an embodiment.

FIG. 15 is a schematic diagram of a structure of a communication apparatus 150 according to an embodiment of this application. The communication apparatus 150 may be a node, or may be a component in a node, for example, a chip or an integrated circuit. The apparatus 150 may include at least one memory 1501 and at least one processor 1502. Optionally, a bus 1503 may be further included. Further optionally, a communication interface 1504 may be further included. The memory 1501, the processor 1502, and the communication interface 1504 are connected through the bus 1503.

The memory 1501 is configured to provide storage space, and the storage space may store data such as an operating system and a computer program. The memory 1501 may be one or a combination of a random access memory (RAM), a read-only memory (ROM), an erasable programmable read-only memory (EPROM), a portable read-only memory (compact disc read-only memory, i.e. CD-ROM), or the like.

The processor 1502 is a module that performs an arithmetic operation and/or a logic operation, and may be specifically one or a combination of processing modules such as a central processing unit (CPU), a graphics processing unit (GPU), a microprocessor unit (MPU), an application-specific integrated circuit (ASIC), a field programmable gate array (FPGA), and a complex programmable logic device (CPLD).

The communication interface 1504 is configured to receive data sent by an external device and/or send data to an external device, and may be a wired link interface such as an Ethernet cable, or may be a wireless link (Wi-Fi, Bluetooth, general wireless transmission, or the like) interface. Optionally, the communication interface 1504 may further include a transmitter (for example, a radio frequency transmitter or an antenna), a receiver, or the like coupled to the interface.

The processor 1502 in the apparatus 150 is configured to read the computer program stored in the memory 1501, and is configured to perform the foregoing communication method, for example, the communication method described in FIG. 3, FIG. 7, FIG. 11, or FIG. 12A and FIG. 12B.

For example, the processor 1502 in the apparatus 150 is configured to read the computer program stored in the memory 1501, to perform the following operations:

receiving an association request message from a second node through the communication interface 1504;

determining a group key of a first communication group, where the first communication group is a communication group to which the second node belongs, and the group key of the first communication group is determined based on at least one of a first freshness parameter and an identifier ID of the first communication group;

encrypting the group key of the first communication group based on a shared key between a first node and the second node, to obtain a first protection key; and sending a first association establishment message to the second node through the communication interface 1504, where the first association establishment message includes the first protection key.

In still another possible implementation method, the processor 1502 is specifically configured to:

encrypt the group key of the first communication group based on the shared key between the first node and the second node and a second freshness parameter, to obtain the first protection key.

In still another possible implementation method, the processor 1502 is specifically configured to:

generate a first intermediate key based on the shared key between the first node and the second node and a second freshness parameter by using a first key derivation function KDF, where the first KDF is a KDF supported by the second node; and perform exclusive-OR processing on the first intermediate key and the group key of the first communication group, to obtain the first protection key.

In still another possible implementation method, the shared key is an encryption key between the first node and the second node, the second freshness parameter is a number once, and the first association establishment message includes the second freshness parameter.

In still another possible implementation method, the second freshness parameter is a value of a first counter, and the first counter is used to represent a quantity of times for encrypting the group key of the first communication group based on the shared key.

In still another possible implementation method, the processor 1502 is specifically configured to:

determine the group key of the first communication group based on the ID of the first communication group, where a correspondence exists between the ID of the first communication group and the group key of the first communication group; or generate the group key of the first communication group based on at least one of the first freshness parameter and the ID of the first communication group by using a second KDF.

In still another possible implementation method, the processor 1502 is further configured to:

determine a group security algorithm, where the group security algorithm is an algorithm supported by nodes in the first communication group, and the group security algorithm includes at least one of a group encryption algorithm, a group integrity protection algorithm, and a group KDF algorithm.

The first association establishment message further includes information used to indicate the group security algorithm.

In still another possible implementation method, the group security algorithm is an algorithm with a highest priority in algorithms supported by nodes in the first communication group.

In still another possible implementation method, the processor 1502 is specifically configured to: determine the group security algorithm based on an algorithm selection policy. The algorithm selection policy includes at least one of a priority-based algorithm selection policy and a sequence-based algorithm selection policy.

In still another possible implementation method, the group security algorithm includes a third KDF algorithm, and the processing unit is further configured to:

generate a session key of the first communication group by using the third KDF algorithm based on types of the group key and the session key of the first communication group.

In still another possible implementation method, the key type includes one or more of a signaling plane encryption key, a user plane encryption key, a signaling plane integrity protection key, or a user plane integrity protection key; or the type of the session key corresponds to a scenario in which the session key is applied.

In still another possible implementation method, the processor 1502 is further configured to:

confirm that encryption is not enabled for a signaling plane message between the first node and the second node.

In still another possible implementation method, encryption is enabled for the signaling plane message between the first node and the second node, and the processor 1502 is further configured to:

send a second association establishment message to the second node through the communication interface 1504, where the second association establishment message includes the group key of the first communication group, and the second association establishment message belongs to the signaling plane message between the first node and the second node.

In still another possible implementation method, the processor 1502 is further configured to:

determine that a condition for updating the group key of the first communication group is met;

determine a first key based on at least one of a third freshness parameter and the identifier ID of the first communication group;

encrypt the first key based on the shared key between the first node and the second node, to obtain a second protection key; and send a key update message to the second node through the communication interface 1504, where the key update message includes the second protection key.

In still another possible implementation method, the first key is used to replace the group key of the first communication group.

In still another possible implementation method, the key update message is further used to indicate start time of the first key and a validity period of the first key, and the first key is applied within the validity period of the first key starting from the start time of the first key.

In still another possible implementation method, the processor 1502 is further configured to:

determine that an update acknowledgment message from at least one second node that belongs to the first communication group is received; and apply the first key at the start time of the first key.

In still another possible implementation method, the processor 1502 is specifically configured to:

determine that update acknowledgment messages from all second nodes that belong to the first communication group are received.

In still another possible implementation method, the processor 1502 is specifically configured to:

encrypt the first key based on the shared key between the first node and the second node and a fourth freshness parameter, to obtain the second protection key.

In still another possible implementation method, the condition for updating includes:

a difference between a frame number of a current communication frame and a marked frame number is greater than or equal to a first threshold, where the frame number of the current communication frame and the marked frame number are in a same round of counting cycle, and the marked frame number is a frame number on which key update needs to be performed or the marked frame number is a frame number of a communication frame encrypted for the first time by using the group key of the first communication group;

a difference between the marked frame number and the frame number of the current communication frame is less than or equal to a second threshold, where the frame number of the current communication frame is in a next round of counting cycle of the marked frame number, and the marked frame number is a frame number on which key update needs to be performed or the marked frame number is a frame number of a communication frame encrypted for the first time by using the group key of the first communication group;

a validity period of the group key of the first communication group expires or use duration of the group key of the first communication group reaches a third threshold; or the at least one second node in the first communication group leaves the first communication group.

It should be noted that for implementation of each unit, refer to corresponding descriptions in the embodiment shown in FIG. 3, FIG. 7, FIG. 11, or FIG. 12A and FIG. 12B. The apparatus 150 may be the first node in the embodiment shown in FIG. 3, FIG. 7, FIG. 11, or FIG. 12A and FIG. 12B.

Figure 16:
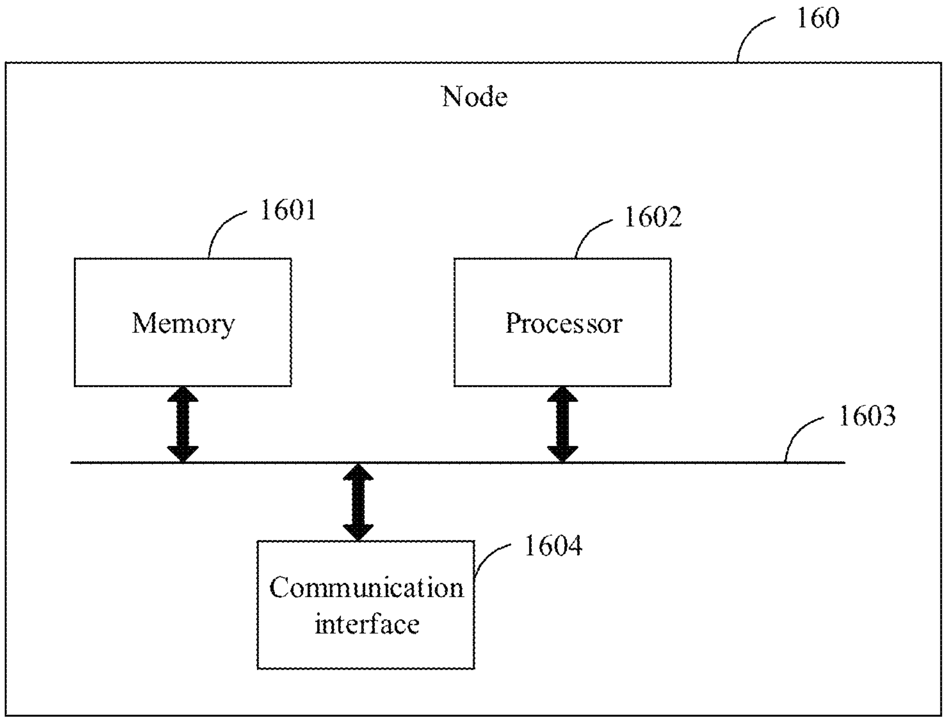
FIG. 16 is a schematic diagram of a structure of yet another communication apparatus according to an embodiment.

FIG. 16 is a schematic diagram of a structure of a communication apparatus 160 according to an embodiment of this application. The communication apparatus 160 may be a node, or may be a component in a node, for example, a chip or an integrated circuit. The apparatus 160 may include at least one memory 1601 and at least one processor 1602. Optionally, a bus 1603 may be further included. Further optionally, a communication interface 1604 may be further included. The memory 1601, the processor 1602, and the communication interface 1604 are connected through the bus 1603.

The memory 1601 is configured to provide storage space, and the storage space may store data such as an operating system and a computer program. The memory 1601 may be one or a combination of a RAM, a ROM, an EPROM, a CD-ROM, and the like.

The processor 1602 is a module that performs an arithmetic operation and/or a logic operation, and may be specifically one or a combination of processing modules such as a CPU, a GPU, an MPU, an ASIC, an FPGA, and a CPLD.

The communication interface 1604 is configured to receive data sent by an external device and/or send data to an external device, and may be a wired link interface such as an Ethernet cable, or may be a wireless link (Wi-Fi, Bluetooth, or the like) interface. Optionally, the communication interface 1604 may further include a transmitter (for example, a radio frequency transmitter or an antenna), a receiver, or the like coupled to the interface.

The processor 1602 in the apparatus 160 is configured to read the computer program stored in the memory 1601, and is configured to perform the foregoing communication method, for example, the communication method described in FIG. 3, FIG. 7, FIG. 11, or FIG. 12A and FIG. 12B.

For example, the processor 1602 in the apparatus 160 is configured to read the computer program stored in the memory 1601, to perform the following operations:

sending an association request message to a first node through the communication interface 1604;

receiving a first association establishment message from the first node through the communication interface 1604, where the first association establishment message includes a first protection key; and obtaining a group key of a first communication group based on a shared key between the first node and a second node and the first protection key, where the first communication group is a communication group to which the second node belongs.

In still another possible implementation method, the first node and the second node share the shared key.

In still another possible implementation method, the processor 1602 is specifically configured to:

obtain the group key of the first communication group based on the shared key between the first node and the second node, a second freshness parameter, and the first protection key.

In still another possible implementation method, the processor 1602 is specifically configured to:

generate a first intermediate key based on the shared key between the first node and the second node and a second freshness parameter by using a first key derivation function KDF; and obtain the group key of the first communication group based on the first intermediate key and the first protection key.

In still another possible implementation method, the shared key is an encryption key between the first node and the second node, the second freshness parameter is a number once, and the first association establishment message includes the second freshness parameter.

In still another possible implementation method, the second freshness parameter is a value of a first counter, and the first counter is used to represent a quantity of times for encrypting the group key of the first communication group based on the shared key.

In still another possible implementation method, the first association establishment message further includes information used to indicate a group security algorithm, the group security algorithm is an algorithm supported by nodes in the first communication group, and the group security algorithm includes at least one of a group encryption algorithm, a group integrity protection algorithm, and a group KDF algorithm.

In still another possible implementation method, the group security algorithm is an algorithm with a highest priority in algorithms supported by nodes in the first communication group.

The determining a group security algorithm corresponds to an algorithm selection policy, where the algorithm selection policy includes at least one of a priority-based algorithm selection policy and a sequence-based algorithm selection policy.

In still another possible implementation method, the processor 1602 is further configured to:

generate a session key of the first communication group by using the third KDF algorithm based on types of the group key and the session key of the first communication group.

In still another possible implementation method, the key type includes one or more of a signaling plane encryption key, a user plane encryption key, a signaling plane integrity protection key, or a user plane integrity protection key; or the type of the session key corresponds to a scenario in which the session key is applied.

In still another possible implementation method, before the obtaining the group key of the first communication group based on the shared key between the first node and the second node and the first protection key, further including:

confirming that encryption is not enabled for a signaling plane message between the first node and the second node.

In still another possible implementation method, the processor 1602 is further configured to:

receive a second association establishment message from the first node through the communication interface 1604, where the second association establishment message includes the group key of the first communication group, and the second association establishment message belongs to the signaling plane message between the first node and the second node; and decrypt the second association establishment message by using a signaling plane encryption key between the first node and the second node, to obtain the group key of the first communication group.

In still another possible implementation method, the processor 1602 is further configured to:

receive a key update message from the first node through the communication interface 1604, where the key update message includes a second protection key; and obtain a first key based on the shared key between the first node and the second node and the second protection key.

In still another possible implementation method, the first key is used to replace the group key of the first communication group.

In still another possible implementation method, the key update message is further used to indicate start time of the first key and a validity period of the first key, and the first key is applied within the validity period of the first key starting from the start time of the first key.

In still another possible implementation method, the processor 1602 is further configured to:

send an update acknowledgment message to the first node; and apply the first key at the start time of the first key.

In still another possible implementation method, the processor 1602 is specifically configured to:

obtain the first key based on the shared key between the first node and the second node, a fourth freshness parameter, and the second protection key.

It should be noted that for implementation of each unit, refer to corresponding descriptions in the embodiment shown in FIG. 3, FIG. 7, FIG. 11, or FIG. 12A and FIG. 12B. The apparatus 160 may be the second node in the embodiment shown in FIG. 3, FIG. 7, FIG. 11, or FIG. 12A and FIG. 12B.

An embodiment of this application further provides a computer-readable storage medium. The computer-readable storage medium stores a computer program. When the computer program is run on one or more processors, the method in any embodiment shown in FIG. 3, FIG. 7, FIG. 11, or FIG. 12A and FIG. 12B is performed.

An embodiment of this application further provides a chip system. A communication apparatus of the chip system includes at least one processor and a communication interface, the communication interface is configured to send and/or receive data, and the at least one processor is configured to invoke a computer program stored in at least one memory. When the computer program is run on one or more processors, the method in any embodiment shown in FIG. 3, FIG. 7, FIG. 11, or FIG. 12A and FIG. 12B is performed.

An embodiment of this application further provides a terminal. The terminal includes a first node (for example, an automobile cockpit domain controller CDC) and/or a second node (for example, at least one of modules such as a camera, a screen, a microphone, a speaker, radar, an electronic key, and a passive entry passive start system controller). The first node includes the apparatus described in the embodiment shown in FIG. 13 or FIG. 15, and the second node includes the apparatus described in the embodiment shown in FIG. 13 or FIG. 15.

Further optionally, the terminal may be a vehicle, an uncrewed aerial vehicle, a robot, a device in a smart home scenario, a device in a smart manufacturing scenario, or the like.

An embodiment of this application further provides an intelligent cockpit product. The intelligent cockpit product includes a first node (for example, an automobile cockpit domain controller). The first node is the first node in any embodiment shown in FIG. 3, FIG. 7, FIG. 11, or FIG. 12A and FIG. 12B. Further, the intelligent cockpit product includes a second node (for example, at least one of modules such as a camera, a screen, a microphone, a speaker, radar, an electronic key, and a passive entry passive start system controller). The second node is the second node in any embodiment shown in FIG. 3, FIG. 7, FIG. 11, or FIG. 12A and FIG. 12B.

An embodiment of this application further provides a vehicle. The vehicle includes a first node (for example, an automobile cockpit domain controller). Further, the vehicle further includes a second node (for example, at least one of modules such as a camera, a screen, a microphone, a speaker, radar, an electronic key, and a passive entry passive start system controller). The first node is the first node in any embodiment shown in FIG. 3, FIG. 7, FIG. 11, or FIG. 12A and FIG. 12B, and the second node is the second node in any embodiment shown in FIG. 3, FIG. 7, FIG. 11, or FIG. 12A and FIG. 12B. Alternatively, the vehicle may be replaced with an intelligent terminal or a transportation vehicle such as an uncrewed aerial vehicle or a robot.

An embodiment of this application further provides a computer program product. When the computer program product runs on one or more processors, the communication method described in any embodiment shown in FIG. 3, FIG. 7, FIG. 11, or FIG. 12A and FIG. 12B may be performed.

All or some of the foregoing embodiments may be implemented by using software, hardware, firmware, or any combination thereof. When software is used to implement embodiments, all or some of the embodiments may be implemented in a form of a computer product (for example, a computer program or a computer instruction). When the computer program product is loaded and executed on a computer, the procedures or functions according to embodiments of this application may be all or partially implemented. The computer may be a general-purpose computer, a dedicated computer, a computer network, or another programmable apparatus. The computer program product may be stored in a computer-readable storage medium, or may be transmitted through the computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Sequence adjustment, combination, or deletion may be performed on the steps in the method embodiments of this application based on an actual requirement.

Combination, division, and deletion may be performed on the modules in the apparatus embodiments of this application based on an actual requirement.

What is claimed is:

1. A communication method for a first node, comprising:

receiving an association request message from a second node, wherein the association request message comprises information about a security algorithm supported by the second node;

determining a group security algorithm of a first communication group, wherein the group security algorithm is an algorithm supported by a node in the first communication group, wherein the first communication group is a communication group to which the second node belongs;

generating a group key of the first communication group based on a first freshness parameter and an identifier (ID) of the first communication group by using a key derivation function;

encrypting, based on a shared key between a first node and the second node, the group key of the first communication group to obtain a first protection key; and sending a first association establishment message to the second node, wherein the first association establishment message comprises the first protection key and the group security algorithm of the first communication group.

2. The method according to claim 1, wherein the encrypting, based on the shared key between the first node and the second node, the group key of the first communication group to obtain the first protection key comprises:

encrypting, based on the shared key between the first node and the second node and a second freshness parameter, the group key of the first communication group to obtain the first protection key.

3. The method according to claim 2, wherein the shared key is an encryption key between the first node and the second node, the second freshness parameter is a number, and the first association establishment message comprises the second freshness parameter.

4. The method according to claim 2, wherein the second freshness parameter is a value of a first counter, and wherein the first counter is used to represent a quantity of times for encrypting the group key of the first communication group based on the shared key.

5. The method according to claim 1, wherein the group security algorithm comprises at least one of a group encryption algorithm, a group integrity protection algorithm, and/or a group KDF algorithm, and.

6. The method according to claim 5, wherein the group security algorithm comprises the group KDF algorithm, and the method further comprises:

generating a session key of the first communication group by using the group KDF algorithm, wherein the session key of the first communication group is generated based on the group key of the first communication group and a key type for the session key of the first communication group.

7. The method according to claim 1, wherein before the encrypting the group key of the first communication group to obtain the first protection key, the method further comprises:

confirming that encryption is not enabled for a signaling plane message between the first node and the second node.

8. The method according to claim 1, the method further comprising:

determining that a condition for updating the group key of the first communication group is met;

determining a second group key based on at least one of a second freshness parameter and the identifier ID of the first communication group;

encrypting, based on the shared key between the first node and the second node, the first second group key to obtain a second protection key; and sending a key update message to the second node, wherein the key update message comprises the second protection key.

9. The method according to claim 8, wherein the key update message is further used to indicate a start time of the second group key.

10. The method according to claim 9, wherein after the sending the key update message to the second node, the method further comprises:

determining that an update acknowledgment message from the second node or a further node that belongs to the first communication group is received; and applying the second group key at the start time.

11. The method according to claim 8, wherein the encrypting, based on the shared key between the first node and the second node, the second group key to obtain the second protection key comprises:

encrypting, based on the shared key between the first node and the second node and a third freshness parameter, the second group key to obtain the second protection key.

12. The method according to claim 8, wherein the condition for updating the group key of the first communication group comprises:

a difference between a frame number of a current communication frame and a marked frame number is greater than or equal to a first threshold, wherein the frame number of the current communication frame and the marked frame number are in a same round of a counting cycle, and the marked frame number is a frame number on which a key update needs to be performed or the marked frame number is a frame number of a communication frame encrypted for the first time by using the group key of the first communication group;

a difference between the marked frame number and the frame number of the current communication frame is less than or equal to a second threshold, wherein the frame number of the current communication frame is in a next round of the counting cycle of the marked frame number, and the marked frame number is a frame number on which the key update needs to be performed or the marked frame number is a frame number of a communication frame encrypted for the first time by using the group key of the first communication group;

a validity period of the group key of the first communication group expires or use duration of the group key of the first communication group reaches a third threshold; or the at least one second node in the first communication group leaves the first communication group.

13. The method according to claim 1, further comprising:

sending, by the second node, an association request message to the first node;

receiving, by the second node, the first association establishment message from the first node; and obtaining, by the second node, the group key of the first communication group based on the shared key between the first node and the second node and the first protection key.

14. The method according to claim 13, wherein the obtaining, by the second node, the group key of the first communication group based on the shared key between the first node and the second node and the first protection key comprises:

obtaining the group key of the first communication group based on the shared key between the first node and the second node, a second freshness parameter, and the first protection key.

15. The method according to claim 14, wherein the shared key between the first node and the second node is an encryption key between the first node and the second node, the second freshness parameter is a number, and the first association establishment message comprises the second freshness parameter.

16. The method according to claim 14, wherein the second freshness parameter is a value of a first counter, and wherein the first counter is used to represent a quantity of times for encrypting the group key of the first communication group based on the shared key between the first node and the second node.

17. The method according to claim 13, wherein the group security algorithm comprises at least one of a group encryption algorithm, a group integrity protection algorithm, and a group KDF algorithm.

18. The method according to claim 17, wherein the group security algorithm comprises the group KDF algorithm, and the method further comprises:

generating a session key of the first communication group by using the group KDF algorithm, wherein the session key of the first communication group is generated based on the group key of the first communication group and a key type for the session key of the first communication group.

19. The method according to claim 13, wherein before the obtaining the group key of the first communication group based on the shared key between the first node and the second node and the first protection key, the method further comprises:

confirming that encryption is not enabled for a signaling plane message between the first node and the second node.

* * * * *